United States Patent
Nishimura

(10) Patent No.: US 7,996,732 B2
(45) Date of Patent: Aug. 9, 2011

(54) PROGRAM-EXECUTION MONITORING METHOD, SYSTEM, AND PROGRAM

(75) Inventor: Tadaharu Nishimura, Oobu (JP)

(73) Assignee: Denso Corporation, Kariya (JP)

( * ) Notice: Subject to any disclaimer, the term of this patent is extended or adjusted under 35 U.S.C. 154(b) by 387 days.

(21) Appl. No.: 11/812,086

(22) Filed: Jun. 14, 2007

(65) Prior Publication Data

US 2008/0010563 A1 Jan. 10, 2008

(30) Foreign Application Priority Data

Jun. 14, 2006 (JP) .................................. 2006-164968

(51) Int. Cl.
*G06F 11/00* (2006.01)
(52) U.S. Cl. .............................. 714/55; 714/51; 714/25
(58) Field of Classification Search .................... 714/25, 714/51, 55
See application file for complete search history.

(56) References Cited

U.S. PATENT DOCUMENTS

| | | | |
|---|---|---|---|
| 4,634,110 A * | 1/1987 | Julich et al. ..................... | 714/11 |
| 4,748,587 A | 5/1988 | Combes et al. | |
| 4,970,668 A | 11/1990 | Satoh et al. | |
| 5,257,373 A | 10/1993 | Kurihara et al. | |
| 5,278,976 A | 1/1994 | Wu | |
| 5,715,389 A | 2/1998 | Komori et al. | |
| 5,761,414 A | 6/1998 | Akaishi et al. | |
| 6,594,774 B1 * | 7/2003 | Chapman et al. ................. | 714/2 |
| 6,687,859 B2 * | 2/2004 | Robsman et al. ............... | 714/55 |
| 6,907,606 B1 * | 6/2005 | Jang .............................. | 718/103 |
| 6,934,893 B1 | 8/2005 | Pascal | |
| 7,178,070 B2 * | 2/2007 | Pihet et al. ...................... | 714/55 |
| 7,299,383 B2 * | 11/2007 | David et al. ..................... | 714/51 |
| 2001/0027464 A1 * | 10/2001 | Tavoletti et al. ............. | 709/103 |
| 2002/0078257 A1 | 6/2002 | Nishimura | |
| 2003/0097455 A1 * | 5/2003 | Bauman et al. ............... | 709/230 |
| 2003/0159027 A1 | 8/2003 | Sekiya et al. | |
| 2004/0073891 A1 * | 4/2004 | Boucher ........................ | 717/127 |
| 2004/0216110 A1 * | 10/2004 | Noll et al. ..................... | 718/102 |
| 2005/0183093 A1 * | 8/2005 | Pope et al. .................... | 719/314 |
| 2005/0268300 A1 * | 12/2005 | Lamb et al. ................... | 718/100 |
| 2006/0277448 A1 * | 12/2006 | Koto et al. ...................... | 714/55 |
| 2007/0168740 A1 * | 7/2007 | Nilsson et al. .................. | 714/38 |

FOREIGN PATENT DOCUMENTS

EP 0 663 324 B1 4/1999

(Continued)

OTHER PUBLICATIONS

Partial European Search Report issued in corresponding European Application No. 07011622.3-2211.

(Continued)

*Primary Examiner* — Joshua A Lohn
(74) *Attorney, Agent, or Firm* — Nixon & Vanderhye P.C.

(57) ABSTRACT

A program product is embedded in a media accessible by a computer operative to request a plurality of program tasks for wakeup so as to execute the plurality of program tasks in a predetermined schedule. The program product causes at least one of the computer and another computer to execute the instructions of measuring a delay period between a request of at least one of a plurality of program tasks and a wakeup thereof. The instructions include comparing the measured delay period with a predetermined first timeout value, thus determining whether at least one of the plurality of tasks is abnormally executed by the computer based on the comparison result.

20 Claims, 15 Drawing Sheets

FOREIGN PATENT DOCUMENTS

| | | |
|---|---|---|
| GB | 2 184 875 A | 7/1987 |
| JP | 63-163932 | 7/1988 |
| JP | 03-054644 | 3/1991 |
| JP | 04-001831 | 1/1992 |
| JP | 04-047147 | 2/1992 |
| JP | 04-054648 | 2/1992 |
| JP | 04-280329 | 10/1992 |
| JP | 05-265801 | 10/1993 |
| JP | 07-114490 | 5/1995 |
| JP | 10-198584 | 7/1998 |
| JP | 2000-122900 | 4/2000 |
| JP | 2000-181755 | 6/2000 |
| JP | 2001-318807 | 11/2001 |
| JP | 2001-323836 | 11/2001 |
| JP | 2002-189606 | 7/2002 |
| JP | 2004-054583 | 2/2004 |
| JP | 2005-250659 | 9/2005 |

OTHER PUBLICATIONS

Leaphart et al., "Survey of Software Failsafe Techniques for Safety-Critical Automotive Applications", SAE Technical Paper Series, Delphi Corporation, Apr. 11, 2005, pp. 1-16.

European Search Report dated Dec. 20, 2010 issued in corresponding European Application No. 07011622.3-2211.

Office Action dated Jul. 13, 2010 issued in corresponding Japanese Application No. 2006-164968 with an at least partial English-language translation thereof.

* cited by examiner

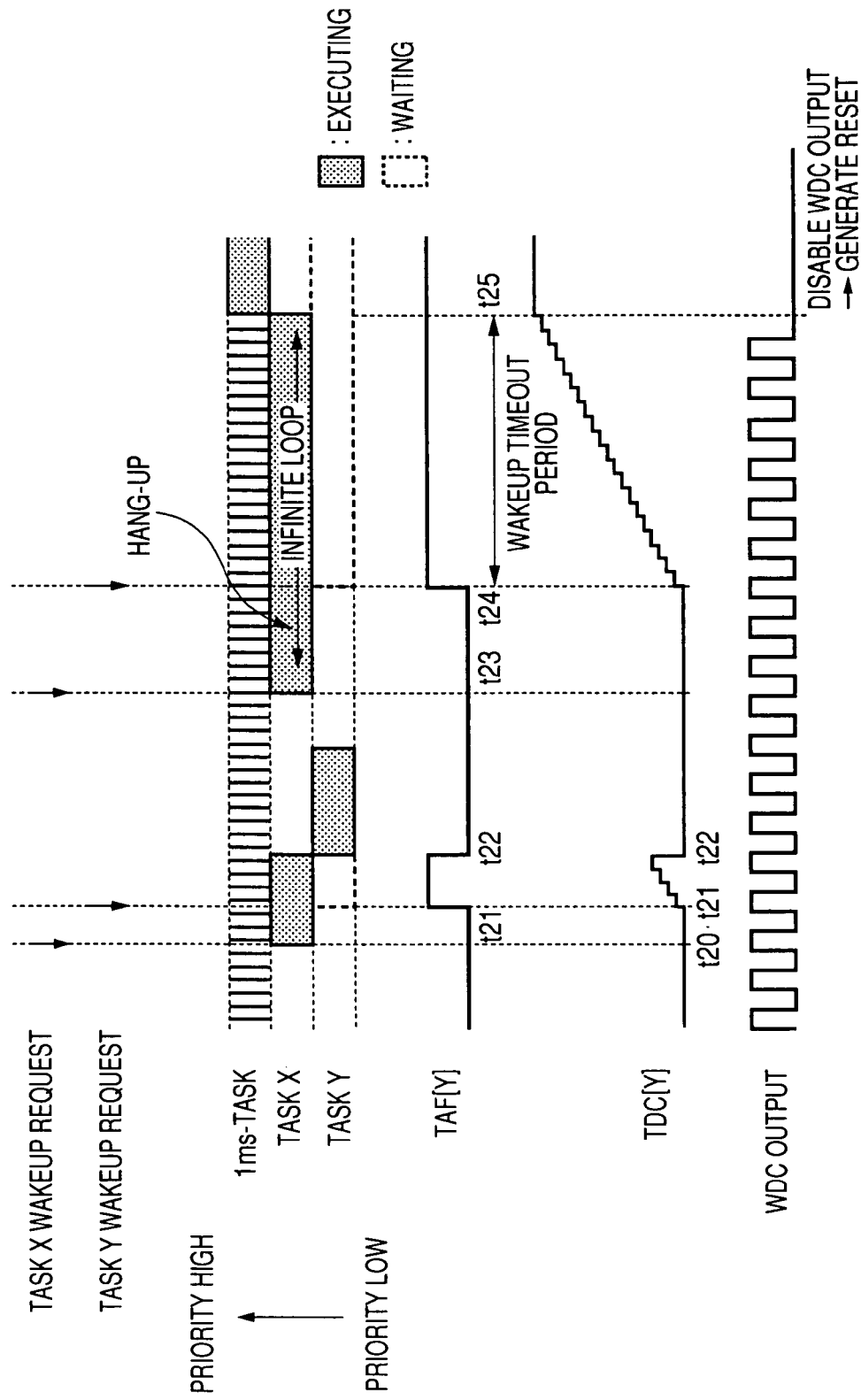

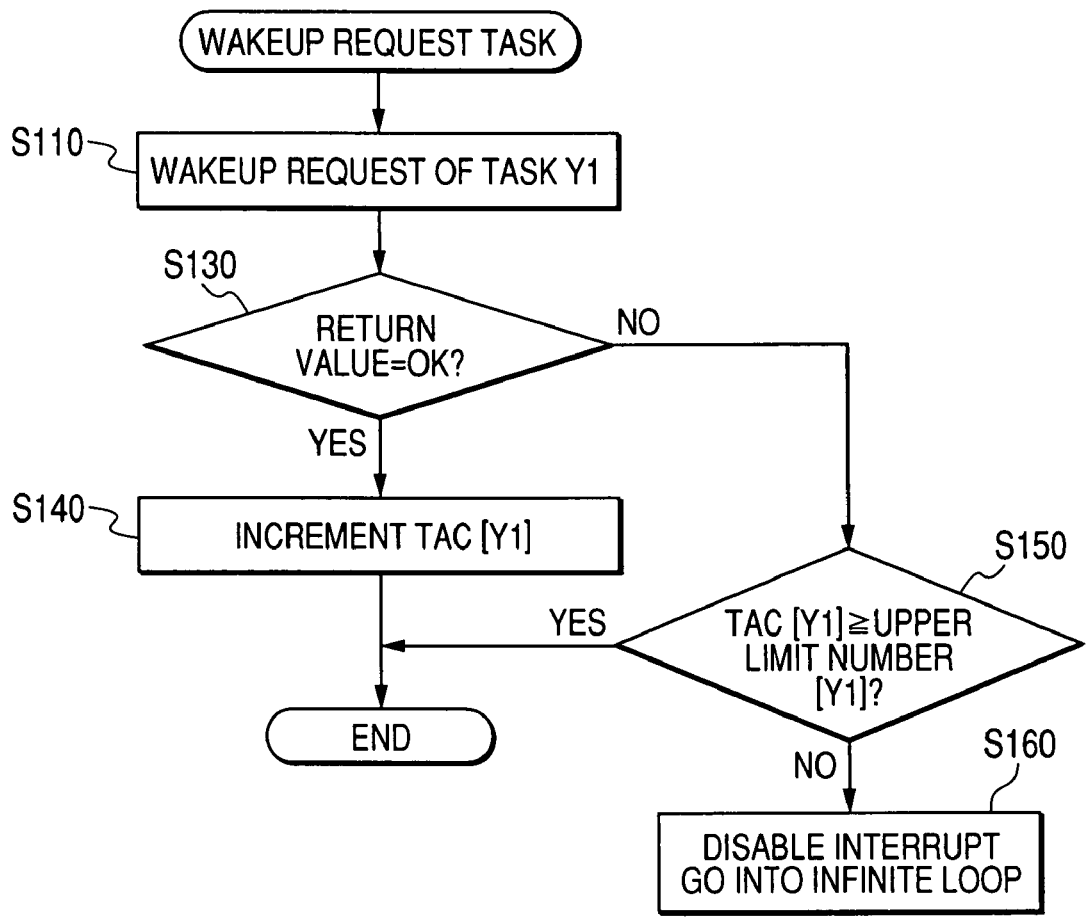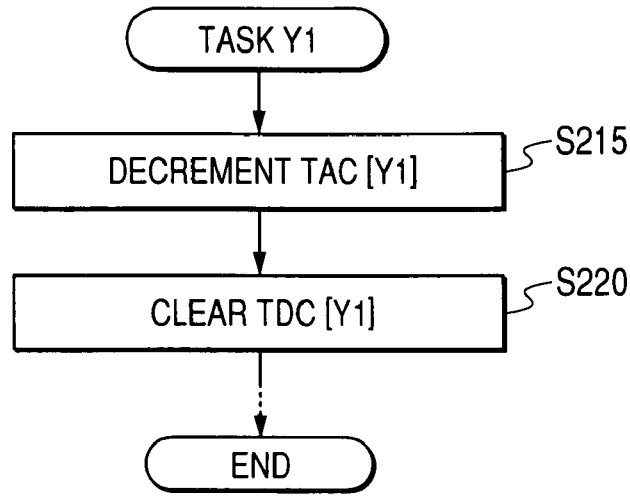

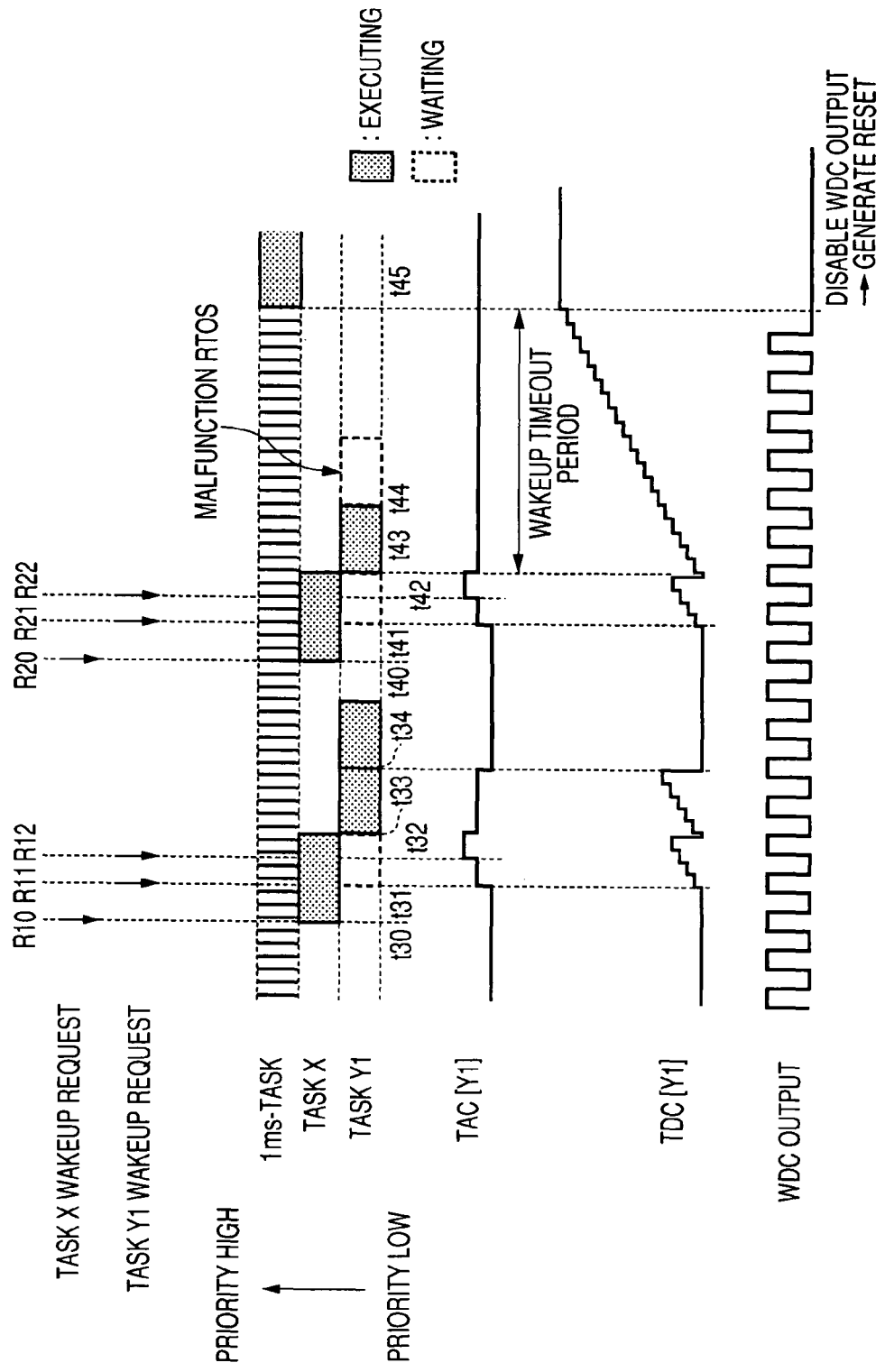

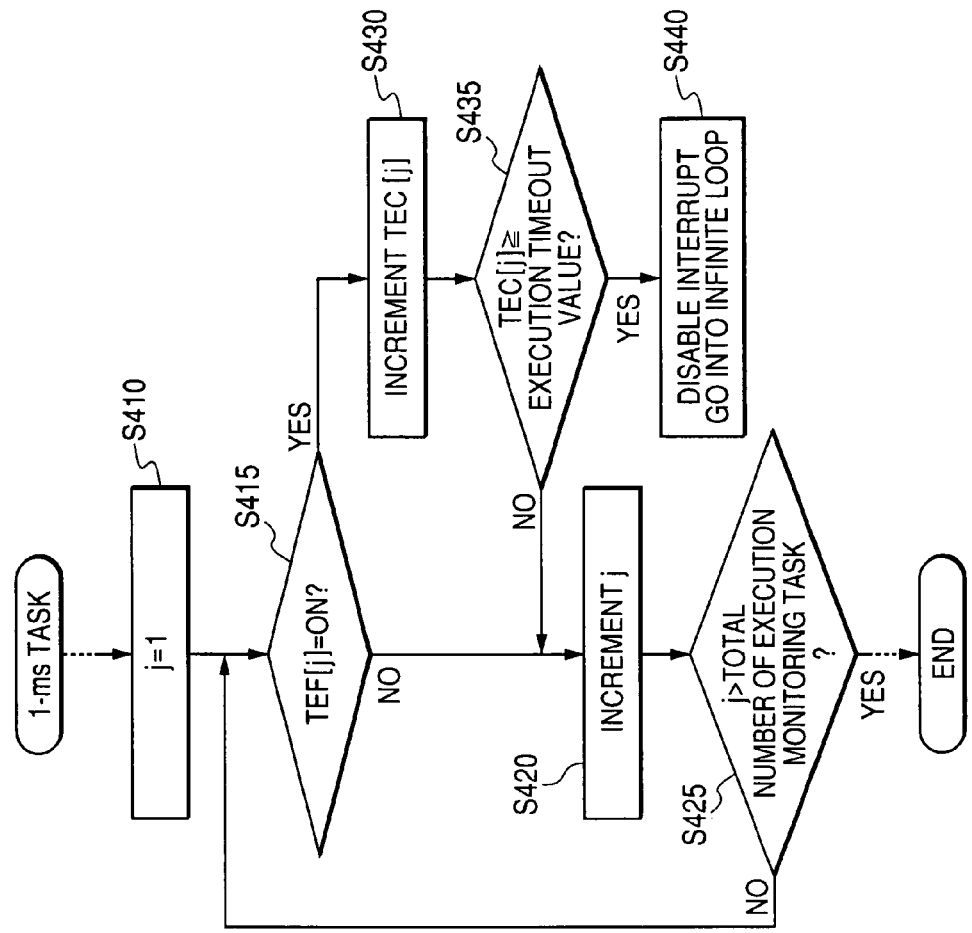
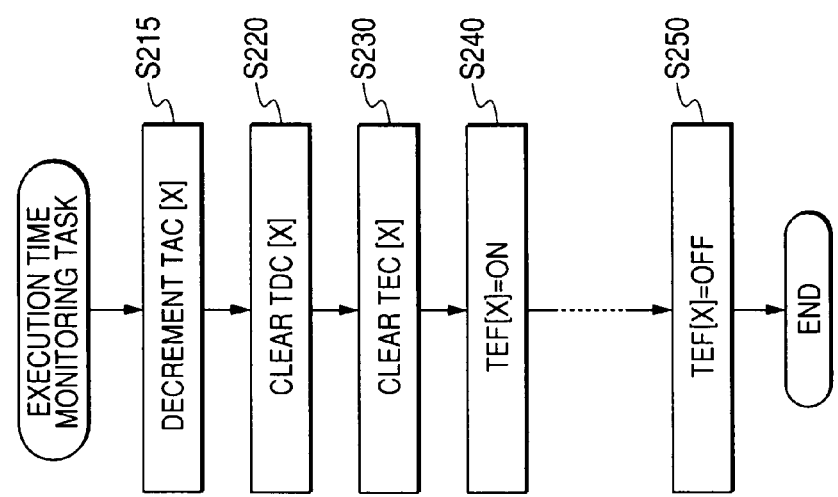

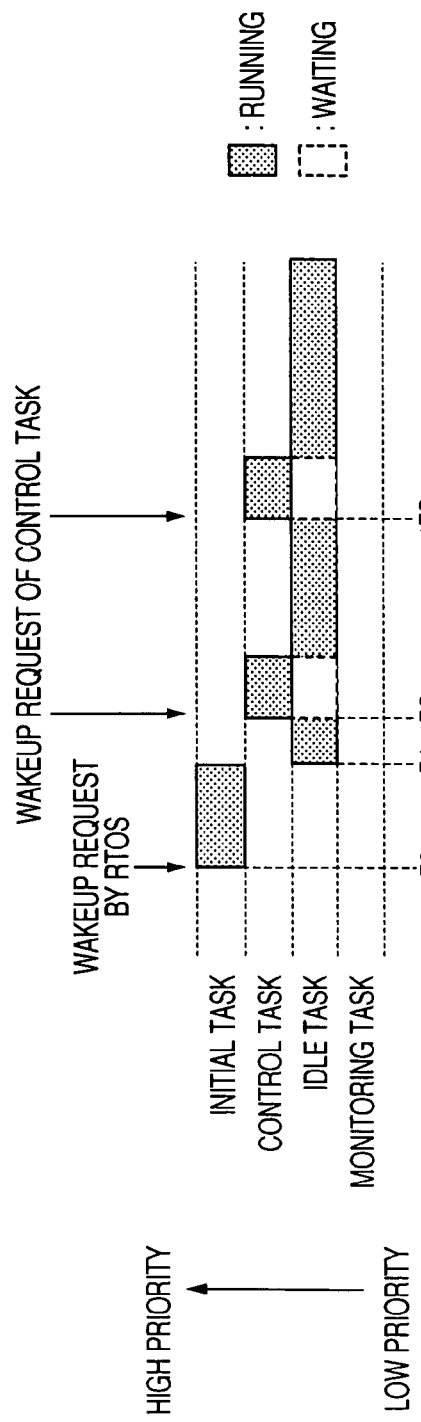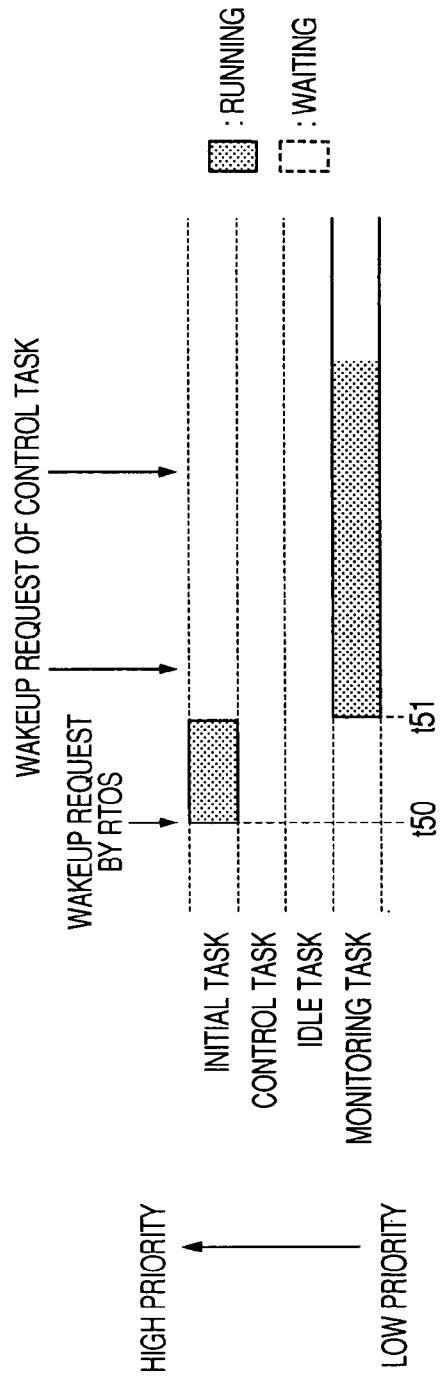

PROGRAM-EXECUTION MONITORING METHOD, SYSTEM, AND PROGRAM

CROSS REFERENCE TO RELATED APPLICATIONS

This application is based on Japanese Patent Application 2006-164968 filed on Jun. 14, 2006. This application claims the benefit of priority from the Japanese Patent Application, so that the descriptions of which are all incorporated herein by reference.

FIELD OF THE INVENTION

The present invention relates to program-execution monitoring techniques, which are capable of monitoring execution of programs by a computer; these programs run under an RTOS (Real-Time Operating System). The RTOS is a multitasking operating system to allow tasks in a program to be performed within predictable timing constraints. The task is a basic unit of programming that an RTOS controls. The task can therefore include the concept of a thread.

BACKGROUND OF THE INVENTION

Conventional electronic control units (ECUs) to be installed in, for example, vehicles are configured to, in case where the program execution of a microcomputer freezes up or hangs up due to disturbances, such as radio noise, detect the freeze or hang-up and reset the microcomputer.

As a method of detecting and handling an abnormal execution of a task that should be programmed to be executed at regular intervals, there is well known a method of resetting a microcomputer using a watchdog timer.

This method provides a watchdog timer to be electrically connected to a microcomputer. The watchdog timer is operative to continuously count. The watchdog timer is also operative to output a reset signal to the microcomputer unless it is reset at first regular intervals by a watchdog timer clear signal (WDC signal) output from the microcomputer.

On the other hand, in the microcomputer, a specific routine (task) in a program to be executed thereby at second regular intervals shorter than the first regular intervals is installed in advance in the microcomputer. The specific routine being executed by the microcomputer at the second regular intervals works to output the WDC signal to the watchdog timer.

The method using watchdog timer can determine that the program execution freezes up or hangs up when the routine is abnormally carried out by the microcomputer due to any trouble so that the duration of no WDC signal output state from the microcomputer exceeds a predetermined period. Thus, the method enables the watchdog timer to reset the microcomputer.

However, in a program consisting of a plurality of tasks with priority and designed to run under the RTOS set forth above, even if the program freezes up or hangs up under execution of a task in the program, such as the task goes to an infinite loop, another task higher in priority than the hung/frozen task may be interrupted to be normally handled.

The interrupted handle of another task higher in priority than the hung/frozen task disable output of the WDC signal to the watchdog timer, thereby frequently resetting the microcomputer. This may cause the execution of the program to be frequently interrupted.

Thus, in order to avoid the frequent interruptions, installation of the specific task in a program to be executed by a microcomputer is insufficient. A specific task (routine) designed to be launched and executed by a microcomputer at regular intervals will be referred to as "time synchronized task" hereinafter.

Thus, there is conventionally well-known a method of monitoring an abnormal execution of a program consisting of a plurality of tasks with priority and designed to run under the RTOS. For example, such a method is disclosed in Japanese Unexamined Patent Publication No. H07-114490.

The method causes a microcomputer to execute a time synchronized task A higher in priority than some of the remaining tasks, thus repeatedly outputting the WDC signal to a watchdog timer.

In the method, the time synchronized task A being executed by the microcomputer monitors whether a specific task B with the lowest priority in all of the tasks is normally executed.

When it is determined that no specific task B has been carried out for more than a constant period of time, the time synchronized task A disables output of the WDC signal. This enables the watchdog timer to reset the microcomputer.

Specifically, when a task equal to or higher in priority than the time synchronized task A hangs up or freezes up, no task A itself is executed so that no WDC signal is outputted from the microcomputer. In addition, when a task lower in priority than the task A hangs up or freezes up, no task B is carried out so that the task A disables output of the WDC signal.

Accordingly, even if any task hangs up or freezes up, it is possible to reliably reset the microcomputer.

In the conventional method of monitoring an abnormal execution of a program under the RTOS, the RTOS is designed to allow a plurality of tasks of a program to be properly scheduled in priority. If a task hangs up or freezes up, some of the tasks equal to or lower in priority than the hung/frozen task cannot be executed under the RTOS.

Thus, if a malfunction occurs in the RTOS so that the remaining tasks except for the tasks A and B cannot be executed, the conventional method cannot detect the abnormal conditions set forth above appearing in the microcomputer.

SUMMARY OF THE INVENTION

In view of the background, an object of an aspect of the present invention is to enable, when a malfunction occurs in an RTOS installed in a microcomputer so that a task to be requested to wake up cannot be executed by the microcomputer, detection of such abnormal conditions appearing in the microcomputer.

According to one aspect of the present invention, there is provided a program product embedded in a media accessible by a computer operative to request a plurality of program tasks for wakeup so as to execute the plurality of program tasks in a predetermined schedule in accordance with a real time operating system running on the computer. The program product causes at least one of the computer and another computer to execute the instructions of: measuring a delay period between a request of at least one of the plurality of program tasks and a wakeup thereof; and comparing the measured delay period with a predetermined first timeout value, thus determining whether at least one of the plurality of tasks is abnormally executed by the computer based on the comparison result.

According to another aspect of the present invention, there is provided a computer capable of executing the instructions of the one aspect.

According to a further aspect of the present invention, there is provided an electronic unit having a microcomputer capable of executing the instructions of the one aspect or another aspect.

According to a still further aspect of the present invention, there is provided a computer-implemented method for detecting an abnormal execution of a plurality of program tasks. The plurality of program tasks are requested for wakeup so as to be executed in a predetermined schedule in accordance with a real time operating system running on the computer. The computer implemented method includes measuring a delay period between a request of at least one of the plurality of program tasks and a wakeup thereof, and comparing the measured delay period with a predetermined timeout value, thus determining whether at least one of the plurality of tasks is abnormally executed by the computer based on the comparison result.

BRIEF DESCRIPTION OF THE DRAWINGS

Other objects and aspects of the invention will become apparent from the following description of embodiments with reference to the accompanying drawings in which:

FIG. 6 is a timing chart schematically illustrating operations of the microcomputer under a delay-period monitoring task according to the first embodiment;

FIG. 7A is a flowchart schematically illustrating operations of the microcomputer in accordance with a wakeup request task according to a second embodiment of the present invention;

FIG. 7B is a flowchart schematically illustrating operations of the microcomputer in accordance with a delay-period monitoring task according to the second embodiment;

FIG. 8 is a timing chart schematically illustrating operations of the microcomputer under a delay-period monitoring task according to the second embodiment;

FIG. 9A is a flowchart schematically illustrating operations of the microcomputer in accordance with an execution time monitoring task according to a third embodiment of the present invention;

FIG. 9B is a flowchart schematically illustrating operations of the microcomputer in accordance with a 1-ms task according to the third embodiment;

FIG. 13A is a timing chart schematically illustrating operations of the microcomputer in accordance with a program being normally run thereby according to the fifth embodiment; and FIG. 13B is a timing chart schematically illustrating operations of the microcomputer in accordance with a program being abnormally run thereby according to the fifth embodiment;

DETAILED DESCRIPTION OF EMBODIMENTS OF THE INVENTION

Figure 1:
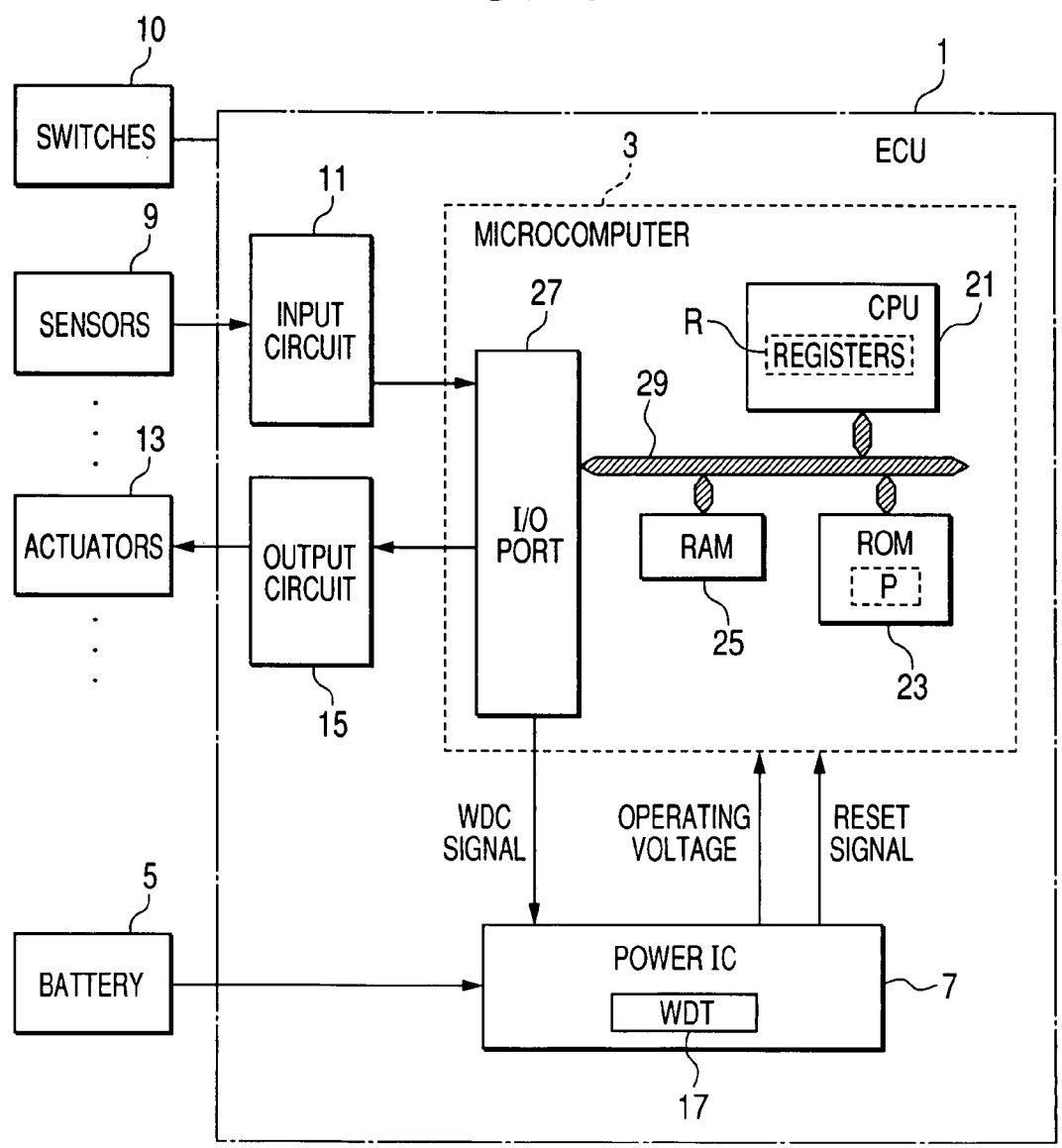
FIG. 1 is a block diagram schematically illustrating an example of the configuration of an electronic control unit according to a first embodiment of the present invention.

Embodiments of the present invention will be described hereinafter with reference to the accompanying drawings. In the drawings, identical reference characters are utilized to identify identical corresponding components.

First Embodiment

A first embodiment of the present invention will be described hereinafter with reference to FIGS. 1 to 6. In the first embodiment, program execution monitoring method and system are applied to an ECU 1. The ECU corresponds to an electronic device with one or more microcomputers and is installed in a vehicle for controlling an engine as an example of in-vehicle devices.

Referring to FIG. 1, the ECU 1 is composed of a microcomputer 3 operative to execute various processes for control of the engine, and a power IC (Integrated Circuit) 7 operative to step down an output voltage (battery voltage) of an in-vehicle battery 5 to a constant power supply voltage (operating voltage), for example, 5 V.

The ECU 1 is composed of an input circuit 11 and an output circuit 15.

A plurality of sensors 9 associated with the various operating conditions of the engine and operative to measure them are installed in advance in the vehicle.

For example, the sensors 9 include a crank angle sensor operative to output, to the ECU 1, a pulse signal consisting of a train of pulses. Specifically, the crank angle sensor is operative to output a pulse of the pulse signal each time a crankshaft of the engine rotates at a constant crank angle.

The sensors 9 include a coolant sensor operative to continuously or periodically measure a temperature of an engine coolant to thereby output, to the ECU 1, a measurement signal indicative of the measured temperature.

The sensors 9 include an airflow meter operative to continuously or periodically measure the flow of air through an intake manifold of the engine, thereby outputting a measurement signal indicative of the measured flow of air.

A plurality of switches 10 manually or automatically operable and associated with the various operating conditions of the engine are installed in the vehicle. The switches 10 are operative to continuously or periodically output pieces of information indicative of their operating states, such as, on state or off state.

The input circuit 11 is electrically connected to the sensors 9 and switches 10.

The input circuit 11 is operative to receive the measurement signals output from the various sensors 9, convert them into pieces of measurement data in analog/digital format that the microcomputer 3 can recognize, and supply the converted pieces of measurement data to the microcomputer 3.

For example, the input circuit 11 is operative to:

apply waveform shaping to the measurement signals respectively output from the various sensors 9 as necessary;

convert the waveform-shaped measurement signals respectively into pieces of digital measurement data as need arises; and enter the pieces of digital measurement data to the microcomputer 3.

The input circuit 11 is also operative to receive the pieces of information output from the switches 10, convert them into pieces of switch data in analog/digital format that the microcomputer 3 can recognize, and supply the converted pieces of switch data to the microcomputer 3.

A plurality of actuators 13 operative to drive the engine based on control signals supplied from the microcomputer 3 are installed in advance in the vehicle.

For example, the actuators 13 include injectors and igniters for the respective cylinders of the engine. The injector for each cylinder is operative to meter fuel into the intake manifold, and the igniter for each cylinder is operative to ignite the air-fuel mixture in each cylinder of the engine.

The output circuit 15 is operative to output, to the actuators 13, such as injectors and igniters for the respective cylinders, control signals, for activation, control, and stop of them based on the control signals sent from the microcomputer 3.

The microcomputer 3 is composed of a CPU 21, a ROM, such as a flash ROM, 23, a RAM 25, an input/output (I/O) port 27, and a bus 29. The CPU 21, the ROM 23, the RAM 25, and the I/O port 27 can communicate with each other via the bus 29.

The CPU 21 is composed of a plurality of internal registers R and is configured to execute, based on the registers R, various processes in accordance with instructions of each of various programs P stored in advance in corresponding addresses of the ROM 23 and/or those of the RAM 25.

Each of the programs P includes a program-execution monitoring program. Specifically, the program-execution monitoring program causes the CPU 21 to execute program-execution monitoring processes illustrated in FIGS. 5A to 5C described hereinafter.

The RAM 25 is operative to temporarily store data representing processing results of the CPU 21, and the I/O port 27 is operative to input/output signals between the microcomputer 3 and each of the input and output circuits 11 and 15.

The power IC 7 is composed of a watchdog timer (WDT) 17. The watchdog timer 17 is operative to monitor whether a program is normally executed by the microcomputer 3. The watchdog timer 17 is configured such that a watchdog timer clear (WDC) signal to be sent from the microcomputer 3 is input thereto. The WDC signal is configured to have a level transiently varying repetitively in time in a predetermined direction, such as a low-to-high direction (rising direction) or high-to-low direction (falling direction) like a pulse signal.

Specifically, the watchdog timer 17 is operative to:

continuously measure a length of time, such as count up or down;

clear the measured length of time every time a predetermined directed level variation, such as low-to-high direction or high-to-low direction appears in the WDC signal; and output a reset signal with a low level (active level) and a predetermined constant duration to the microcomputer 3 unless the measured time length is cleared (reset) within a predetermined watchdog timeout period TO.

The reset signal to be output from the watchdog timer 17 enables the microcomputer 3 to be reset for rebooting thereof.

Figure 2:
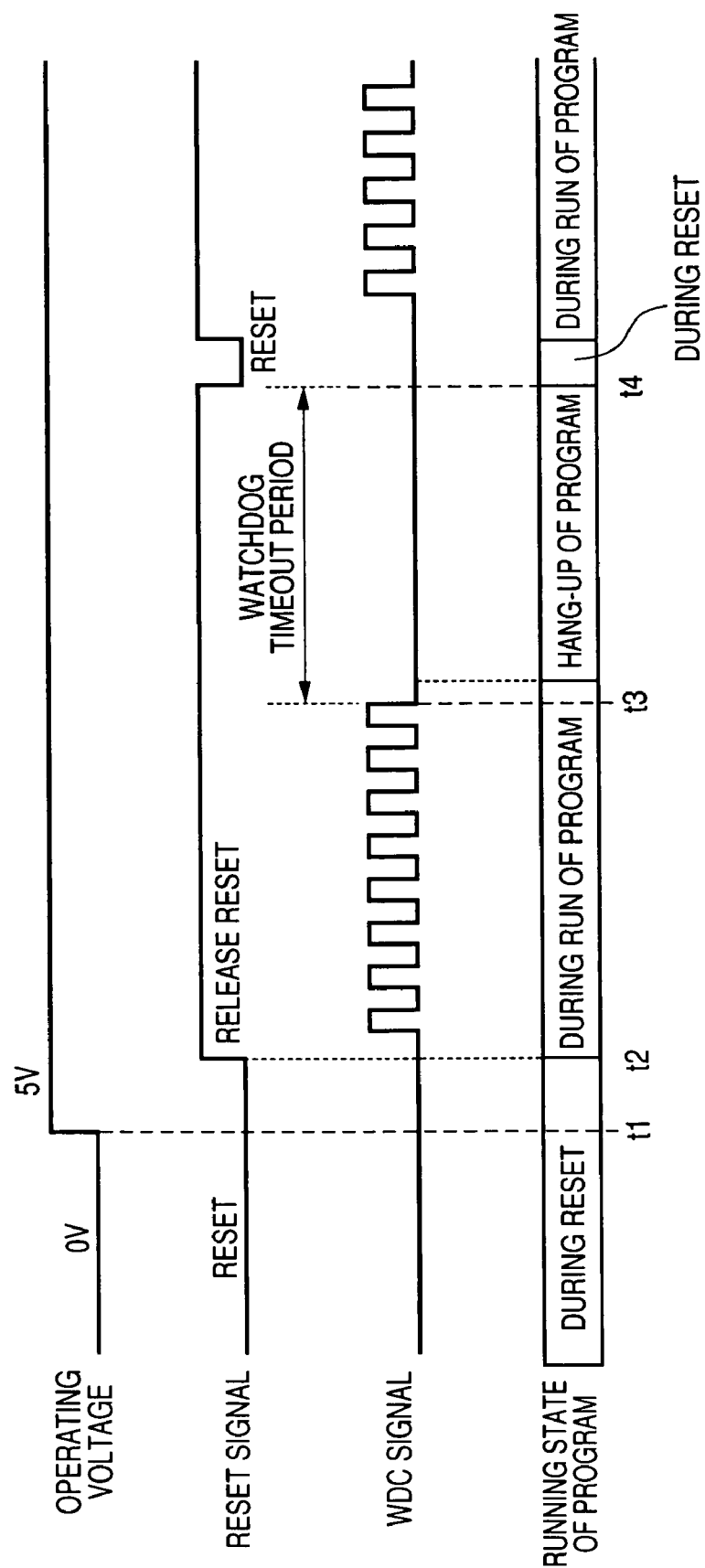
FIG. 2 is a timing chart schematically illustrating an example of procedures for monitoring a microcomputer illustrated in FIG. 1 by a watchdog timer of a power IC illustrated in FIG. 1.

Next, procedures for monitoring the microcomputer 3 by the watchdog timer 17 of the power IC 7 will be described hereinafter with reference to FIG. 2.

Before no power supply voltage is supplied to the microcomputer 3 from the power IC 7, the reset signal is kept to the low level (active level), and no WDC signals are output from the microcomputer 3 to the power IC 7. This brings the microcomputer 3 to be in reset state so that the microcomputer 3 disables execution of programs.

Upon start of the supply of the output voltage to the ECU 1 from the battery 5, the operating voltage of 5 V is started to be supplied from the power IC 7 to the microcomputer 3 at time t1.

After a predetermined period of time has elapsed since time t1, the reset signal being sent from the power IC 7 to the microcomputer 3 is turned from the low level to a high level (inactive level) at time t2. In other words, the reset is released at time t2. The level-change of the reset signal enables the microcomputer 3 to be restarted.

After the microcomputer 3 being restarted, the microcomputer 3 starts to execute at least one of the programs P. A specific task in one of the programs P causes the microcomputer 3 to invert the output level of the WDC signal at regular intervals each shorter than the watchdog timeout period TO, thereby resetting the watchdog timer 17.

During the microcomputer 3 normally executing the specific task, the WDC signal being output from the microcomputer 3 to the power IC 7 (watchdog timer 17) is inverted in level at the regular intervals each shorter than the watchdog timeout period TO.

In contrast, when the specific task is abnormally carried out by the microcomputer 3, no level inversion appears in the WDC signal. When the watchdog timeout period TO has elapsed since the last level inversion in the WDC signal (see time t3 and time t4), the reset signal with the low level and the predetermined constant duration is output from the power IC 7 (watchdog timer 17) to the microcomputer 3 (see time t4). The reset signal enables the microcomputer 3 to be reset.

Note that, in the first embodiment, cases where the microcomputer 3 does not execute the level inversion in the WDC signal include:

a case where no specific task, such as 1-ms task described hereinafter, is carried out by the microcomputer, and a case where the level inversion in the WDC signal is intentionally disabled by the microcomputer 3 that detects an abnormal execution of the at least one program in the programs P during execution of the program-execution monitoring program included in the at least one program in the programs P.

Figure 3:
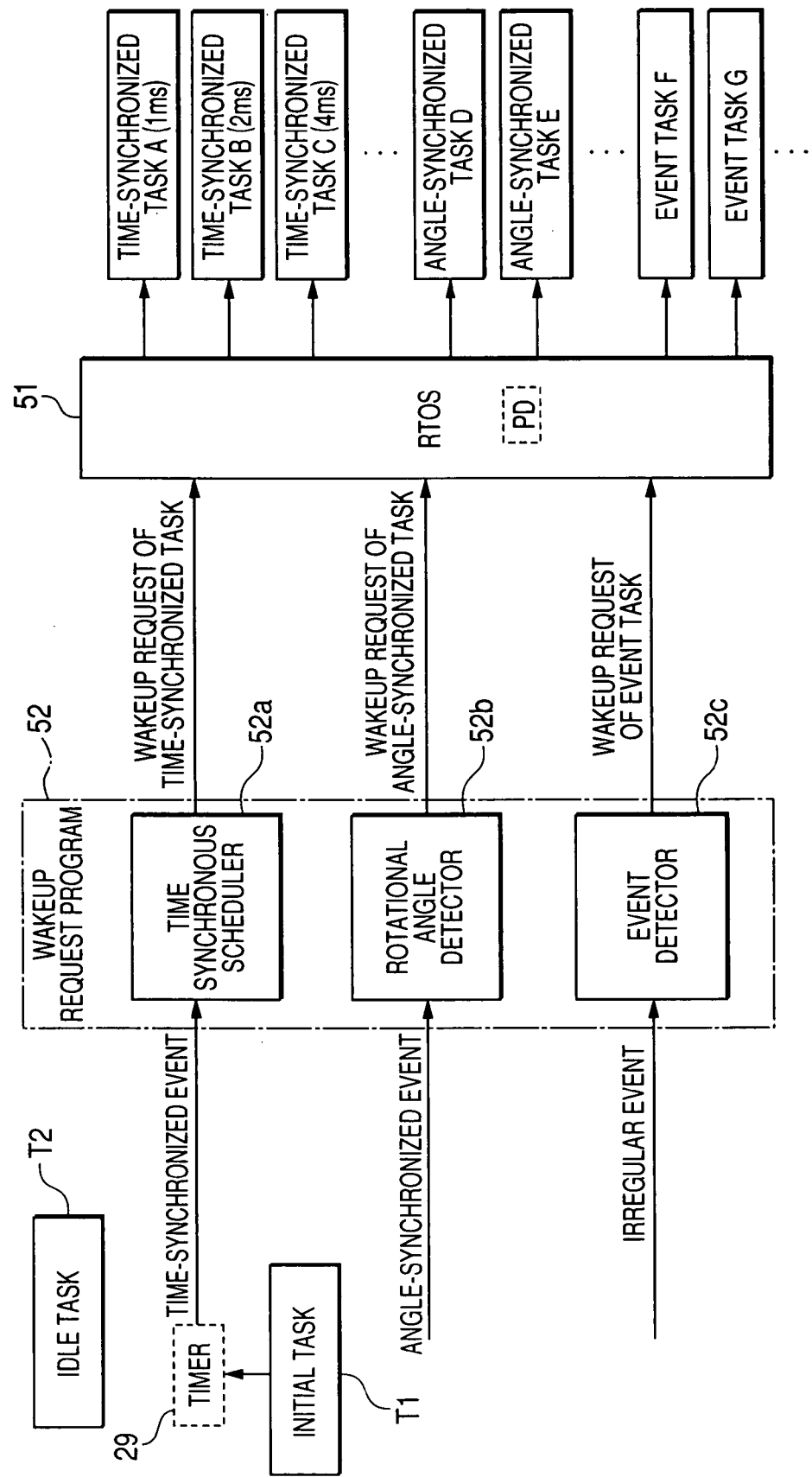
FIG. 3 is a block diagram schematically illustrating an example of the layered structure of a program to be executable by the microcomputer according to the first embodiment.

Next, FIG. 3 schematically illustrates an example of the layered structure of each of the programs P to be executable by the microcomputer 3.

As illustrated in FIG. 3, each of the programs P is composed of a plurality of tasks 50 allocated to the ECU 1 for control of the engine, a real-time operating system (RTOS) 51, a wakeup request program 52 for requesting, to the RTOS 51, wakeup of one of the tasks 50, and various programs for interrupt services. The tasks 50 will be also referred to as "control tasks 50" hereinafter The control tasks 50 in each of the programs P include an initial task T1, a plurality of time-synchronized tasks 50a1, a plurality of angle-synchronized tasks 50a2, a plurality of event tasks 50a3, and an idle task T2.

The initial task T1 is designed to be waked up first by the CPU 21 upon the microcomputer 3 being booted (being initially started). The initial task T1 instructs the CPU 21 to activate a timer 29 for generating a periodic timer interrupt at regular intervals. In the first embodiment, the timer 29 is, for example, configured to generate a periodic timer interrupt at 1 ms (millisecond). The timer 29 can be installed as a hardware component or a software component in the microcomputer 3.

Specifically, the timer 29 is configured to start working when the initial task T1 is executed by the CPU 21.

Each of the time-synchronized tasks 50a1 is designed to be requested, by the CPU 21, to wake up every period of N milliseconds (ms) based on, for example, a main clock consisting of a periodic series of clock pulses with a frequency (clock frequency) on which the microcomputer 3 (CPU 21) operates; this N is a positive integer. A time-synchronized task designed to be requested, by the CPU 21, to wake up every period of N will be referred to as N-ms task hereinafter.

For example, a time-synchronized task A is 1-ms task designed to be requested, by the CPU 21, to wake up every period of 1 ms, a time-synchronized task B is 2-ms task designed to be requested, by the CPU 21, to wake up every period of 2 ms, and a time-synchronized task C is 4-ms task designed to be requested, by the CPU 21, to wake up every period of 4 ms.

Each of the angle-synchronized tasks 50a2 and the event tasks 50a3 is designed to be requested, by the CPU 21, to wake up at irregular time intervals.

Specifically, each of the angle-synchronized tasks 50a2 is designed to be requested, by the CPU 21, to wake up every time the crankshaft of the engine rotates at a corresponding constant angle.

Each of the event tasks 50a3 is designed to be requested, by the CPU 21, to wake up at timings occurring independently of the clock frequency of the CPU 21 and the angular positions of the crankshaft. For example, the timings include a timing at which at least one of the switches 10 is operated by an occupant, and/or a timing at which a malfunction is detected in one of the sensors 9.

The idle task T2 has a priority lower than any control tasks 50. In addition, the idle task T2 is designed to be requested, by the CPU 21, to wake up, by the RTOS 51, after the microcomputer 3 is started. After the wakeup, the idle task T2 is designed to be continuously executed by the microcomputer 3 while allowing other tasks higher in priority than the idle task T2 to be handled as interrupts thereby. In other words, the idle task T2 is designed to be executed during idle time in which the microcomputer 3 is executing no control tasks 50.

The wakeup request program 52 includes a time synchronous scheduler 52a, a rotational angle detector 52b, and event detector 52c.

The time synchronous scheduler 52a is operatively connected to the timer 29 and the RTOS 51 and designed to output wakeup requests of the time-synchronized tasks 50a1 to the RTOS 51.

Specifically, every time the periodic timer interrupt occurs at regular intervals of 1 ms by the timer 29, the time synchronous scheduler 52a causes the CPU 21 to determine that a time-synchronized event every cycle of 1 ms occurs, thus generating a wakeup request of the 1-ms task A.

Every time receiving two temporally adjacent timer interrupts supplied from the timer 29, the time synchronous scheduler 52a causes the CPU 21 to determine that a time-synchronized event every cycle of 2 ms occurs, thereby generating a wakeup request of the 2-ms task B.

Every time receiving four temporally adjacent timer interrupts supplied from the timer 29, the time synchronous scheduler 52a causes the CPU 21 to determine that a time-synchronized event every cycle of 4 ms occurs to thereby generate a wakeup request of the 4-ms task C.

Specifically, the time synchronous scheduler 52a has a function of dividing the frequency of the timer interrupts occurring at regular intervals of 1 ms, whereby to generate the time-synchronized task wakeup requests that are different from each other in cycle.

The rotational angle detector 52b causes the CPU 21 to:
receive the pulse signal output from the crank angle sensor of the sensors 9;
detect the crank angle corresponding to each pulse of the pulse signal; and
determine an angle-synchronized event every cycle of the constant crank angle, thus generating a wakeup request of a corresponding one of the angle-synchronized tasks 50a2.

The event detector 52c causes the CPU 21 to detect the occurrence of an irregular event independently of the clock frequency of the CPU 21 and the angular positions of the crankshaft based on the pieces of measurement data fed from the input circuit 11 and on the pieces of switch data fed therefrom. Every time the detection of occurrence of each irregular event, the event detector 52c causes the CPU 21 to generate a wakeup request of one of the event tasks 50a3 corresponding to each irregular event.

For example, when at least one of the pieces of measurement data fed from the sensors 9 via the input circuit 11 is out of a predetermined corresponding normal range, the event detector 52c causes the CPU 21 to determine that some kind of abnormality occurs in a corresponding at least one of the sensors 9. Then, the event detector 52 causes the CPU 21 to generate a wakeup request of a corresponding one of the event tasks, which allows the CPU 21 to execute diagnostics of some kind of abnormality. For example, the normal range corresponding to each of the pieces of measurement data fed from the sensors 9 via the input circuit 11 has been determined and stored in the event detector 52c.

The RTOS 51 has stored therein priority data PD representing the priority order of the time-synchronized tasks, the angle-synchronized tasks, and the event tasks.

Specifically, the RTOS 51 causes the CPU 21 to schedule some of the control tasks 50 respectively corresponding to the generated wakeup requests based on the priority data PD.

For example, in the first embodiment, each of the control tasks 50 except for the top priority is designed to allow, when being executed by the CPU 21, at least one other task higher in priority than a corresponding one of the control tasks to be handled as interrupts thereby so that a corresponding one of the tasks is interrupted. After completion of the at least one other control task, each of the tasks except for the top priority is designed to be continuously executed by the CPU 21 from the interrupted point.

Note that, in the first embodiment, two tasks with the same priority can be scheduled in, for example, FCFS (First Come First Served) algorism or RR (Round Robin) algorism, which algorisms are well known.

Figure 4:
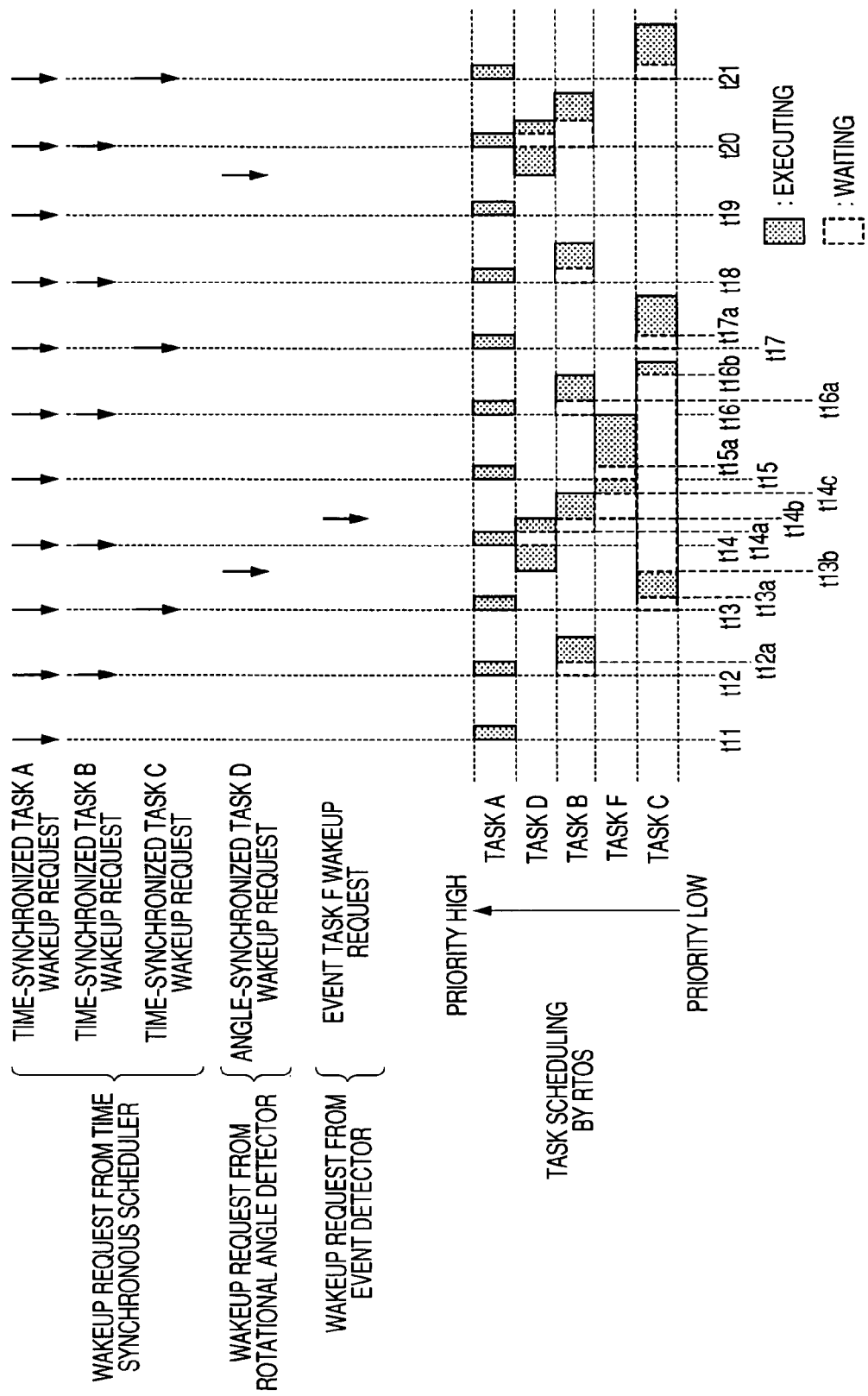
FIG. 4 is a timing chart schematically illustrating operations of the microcomputer under an RTOS illustrated in FIG. 1.

For example, as illustrated in FIG. 4, in the first embodiment, the top priority is set to the 1-ms task A (the time-synchronized task A). In addition, the angle-synchronized task D, the 2-ms task B, the event task F, and the 4-ms task C arranged to be in descending order of priority.

Specifically, in FIG. 4, when a wakeup request of the 1-ms task A is generated in response to the occurrence of the first periodic timer interrupt at time t11, the RTOS 51 schedules the 1-ms task A to wake up at time t11, thereby running the 1-ms task A. After the completion of execution of the 1-ms task A, the 1-ms task A is shifted to sleep mode (suspend mode).

When 1 ms has elapsed since time t11 so that the second periodic timer interrupt occurs in time t12, the RTOS 51 schedules the 1-ms task A to wake up at time t12 to thereby run the 1-ms task A while waiting for wakeup of the 2-ms task B until execution of the 1-ms task A is completed. This is because the 1-ms task A is higher in priority than the 2-ms task B. After completion of execution of the 1-ms task A so that the 1-ms task A is shifted to sleep mode, the RTOS 51 schedules the 2-ms task B to wake up at time t12a. After the completion of execution of the 2-ms task B, the 2-ms task B is shifted to sleep mode.

When 1 ms has elapsed since time t12 so that the third periodic timer interrupt occurs in time t13, the RTOS 51 schedules the 1-ms task A to wake up, thereby running the 1-ms task A while waiting for wakeup of the 4-ms task C until execution of the 1-ms task A is completed. This is because the 1-ms task A is higher in priority than the 4-ms task C. After completion of execution of the 1-ms task A, the RTOS 51 schedules the 4-ms task C to wake up at time t13a.

During execution of the 4-ms task C, when a wakeup request of the angle-synchronized task D is generated at time t13b, the RTOS 51 schedules to:

interrupt the execution of the 4-ms task C at time t13b; and
wake up the angle-synchronized task D as an interrupt at time t13b.

This is because the angle-synchronized task D is higher in priority than the 4-ms task C.

Before completion of execution of the angle-synchronized task D, when 1 ms has elapsed since time t13 so that the fourth periodic timer interrupt occurs in time t14, the RTOS 51 schedules to:

interrupt the execution of the angle-synchronized task D while waiting for wakeup of each of the 2-ms task B and the 4-ms task C at time t14; and
wake up the 1-ms task A at time t14.

This is because the 1-ms task A is the highest in priority in the tasks A to D, the 2-ms task B and the angle-synchronized task D are higher in priority than the 4-ms task C, and the angle-synchronized task D is higher in priority than the 2-ms task B.

After completion of execution of the 1-ms task A, the RTOS 51 schedules to execute the angle-synchronized task D from the interrupted point while waiting for wakeup of each of the 2-ms task B and the 4-ms task C at time t14a.

After completion of execution of the angle-synchronized task D, the RTOS 51 schedules the 2-ms task B to wake up at time t14b while waiting for wakeup for the 4-ms task C.

When the 2-ms task B is completed at time t14c, a wakeup request of the event task F is generated. Then, the RTOS 51 schedules to wake up the event task F while waiting for wakeup of the 4-ms task C at time t14c. This is because the event task F is higher in priority than the 4-ms task C.

Before completion of execution of the event task F, when 1 ms has elapsed since time t14 so that the sixth periodic timer interrupt occurs in time t15, the RTOS 51 schedules to:

interrupt the execution of the event task F while waiting for wakeup of the 4-ms task C at time t15; and
wake up the 1-ms task A at time t15.

This is because the 1-ms task A is the highest in priority in the tasks A, C, and F, and the event task F is higher in priority than the 4-ms task C.

After completion of execution of the 1-ms task A, the RTOS 51 schedules to:

execute the event task F from the interrupted point at time t15a; and
wait for wakeup of the 4-ms task C at time t15a.

When 1 ms has elapsed since time t15, execution of the event task F is completed and the seventh periodic timer interrupt occurs at time t16.

The RTOS 51 schedules to wake up the 1-ms task A while waiting for wakeup of each of the 2-ms task B and 4-ms task C at time t16.

After completion of execution of the 1-ms task A, the RTOS 51 schedules the 2-ms task B to wake up at time t16a while waiting for wakeup for the 4-ms task C.

When the 2-ms task B is completed at time t16b, because no tasks higher in priority than the 4-ms task C are executed, the RTOS 51 schedules to reexecute the 4-ms task C from the interrupted point at time t16b.

When 1 ms has elapsed since time t16, the eighth periodic timer interrupt occurs at time t17.

The RTOS 51 schedules to wake up the 1-ms task A while waiting for wakeup of the 4-ms task C at time t17.

After completion of execution of the 1-ms task A, the RTOS 51 schedules the 4-ms task C to wake up at time t17a.

At the remaining times t18, t19, t20, and t21, the RTOS 51 carries out scheduling operations substantially identical to those at the times t12, t13, t14, and t15.

In the first embodiment, pieces of data representing processing results of the CPU 21 are configured to be temporarily stored in the RAM 25, and pieces of information representing addresses of the pieces of data are also configured to be temporarily stored in the RAM 25. The addresses represent the locations of the pieces of data stored in the RAM 25, and are used for the CPU 21 to accurately execute programs.

In addition, the programs P have been stored in the ROM 23, and at least one of the programs P can be copied from the ROM 23 to the RAM 25 so as to be executed by the CPU 21 thereon.

For these reasons, if corruption of data stored in the RAM 25 occurs due to disturbances, such as radio noise, the microcomputer 3 may not normally execute the programs P. In this case, it is necessary to reset the microcomputer 3.

Next, the program-execution monitoring program to be executable by the CPU 21 for monitoring whether at least one of the programs P is normally executed thereby will be described hereinafter with reference to FIGS. 5A to 5C.

An outline of the program-execution monitoring function to be implemented by execution of the program-execution monitoring program is described first. The program-execution monitoring function is configured to measure a wakeup delay period between output of a wakeup request of a task to the RTOS 51 based on the wakeup request program 52 and wakeup (start of execution) of the task. The program-execution monitoring function is configured to determine whether the measured wakeup delay period is equal to or greater than the predetermined watchdog timeout period TO.

The program-execution monitoring function is configured to, when it is determined that the measured wakeup delay period is equal to or greater than a wakeup timeout period, identifies that the at least one of the programs P is abnormally executed by the CPU 21, thereby disabling the level inversion of the WDC signal. This allows the watchdog timer 17 to reset the microcomputer 3.

Note that, in the first embodiment, as delay-period monitoring tasks for monitor of their wakeup delay periods, the time-synchronized tasks 50a1 except for the 1-ms task A, the angle-synchronized tasks 50a2, and the event tasks 50a3 have been determined. In the first embodiment, sequential numbers beginning with 1 are assigned to the delay-period monitoring tasks.

Figure 5A:
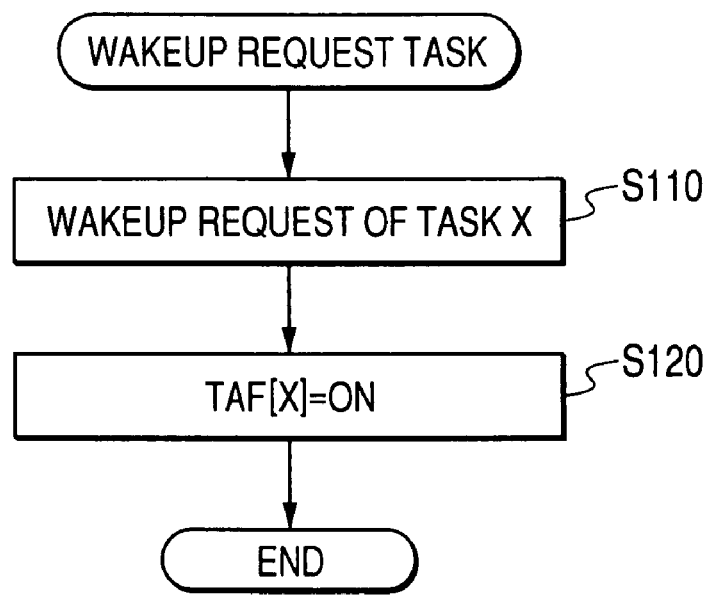
FIG. 5A is a flowchart schematically illustrating operations of the microcomputer in accordance with a wakeup request task illustrated in FIG. 3 according to the first embodiment.

As illustrated in FIG. 5A, an event corresponding to a delay-period monitoring task X of a program P, such as a time-synchronized event based on the timer 29, an angle-synchronized event based on the pulse signal output from the crank angle sensor, or an irregular event, occurs. At that time, the wakeup request program 52 causes the CPU 21 to generate a wakeup request of the delay-period monitoring task X in step S110.

Next, the wakeup request program 52 causes the CPU 21 to change information in form of a bit held in a wakeup request flag TAF [X] corresponding to the task X from OFF to ON in step S120.

The wakeup request flag TAF corresponding to each of the delay-period monitoring tasks is for example set by software in the microcomputer 3 each time the microcomputer 3 is started.

Note that the information indicative of OFF is set as default information of the wakeup request flag TAF corresponding to each of the delay-period monitoring tasks. In addition, note that the wakeup request flag TAF [X] represents whether a wakeup request of the delay-period monitoring task X occurs. Specifically, when the information indicative of ON is set to the wakeup request flag TAF [X], the wakeup request flag TAF [X] indicates that a wakeup request of the delay-period monitoring task X in the control tasks 50 has occurred. In contrast, when the information indicative of OFF is set to the wakeup request flag TAF [X], the wakeup request flag TAF [X] indicates that no wakeup requests of the delay-period monitoring task X have occurred.

As described above, the RTOS 51 causes the CPU 21 to schedule the delay-period monitoring task X to wake up when no tasks higher in priority than the delay-period monitoring task X are executed.

Figure 5B:
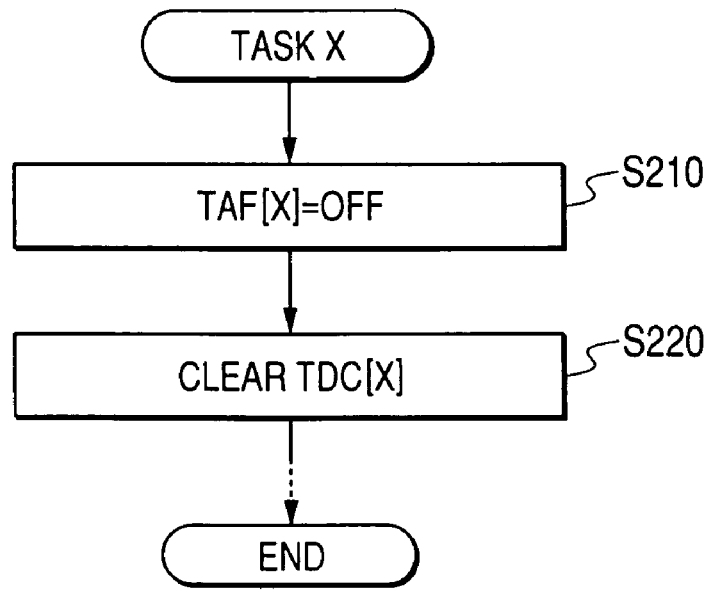
FIG. 5B is a flowchart schematically illustrating operations of the microcomputer in accordance with a delay-period monitoring task according to the first embodiment.

When waking up, the delay-period monitoring task X at its leading address portion causes the CPU 21 to change the information held in the wakeup request flag TAF [X] from ON to OFF in step S210 of FIG. 5B.

Next, the delay-period monitoring task X causes the CPU 21 to clear a count value of a wakeup delay-period counter TDC [X] to zero (0) in step S220. Thereafter, the delay-period monitoring task X at its remaining address portion causes the CPU 21 to execute the original task allocated to the delay-period monitoring task X.

As the wakeup delay-period counter TDC [X], one of the internal registers R of the CPU 21 or a software counter created by the CPU 21 can be used.

Note that the wakeup delay-period counter TDC is a counter for measuring the wakeup delay period between output of a wakeup request of each of the tasks 50 to the RTOS 51 based on the wakeup request program 52 and wakeup (start of execution) of a corresponding one of the tasks 50.

Specifically, the count value of the wakeup delay-period counter TDC [X] represents the wakeup delay period between output of the wakeup request of the delay-period monitoring task X to the RTOS 51 based on the wakeup request program 52 and wakeup (start of execution) of the delay-period monitoring task X. An initial vale of the wakeup delay-period counter TDC [X] is set to 0.

The count value of the wakeup delay-period counter TDC [X] is configured to be incremented by 1 (counted up by 1) by execution of the 1-ms task A described hereinafter.

Figure 5C:
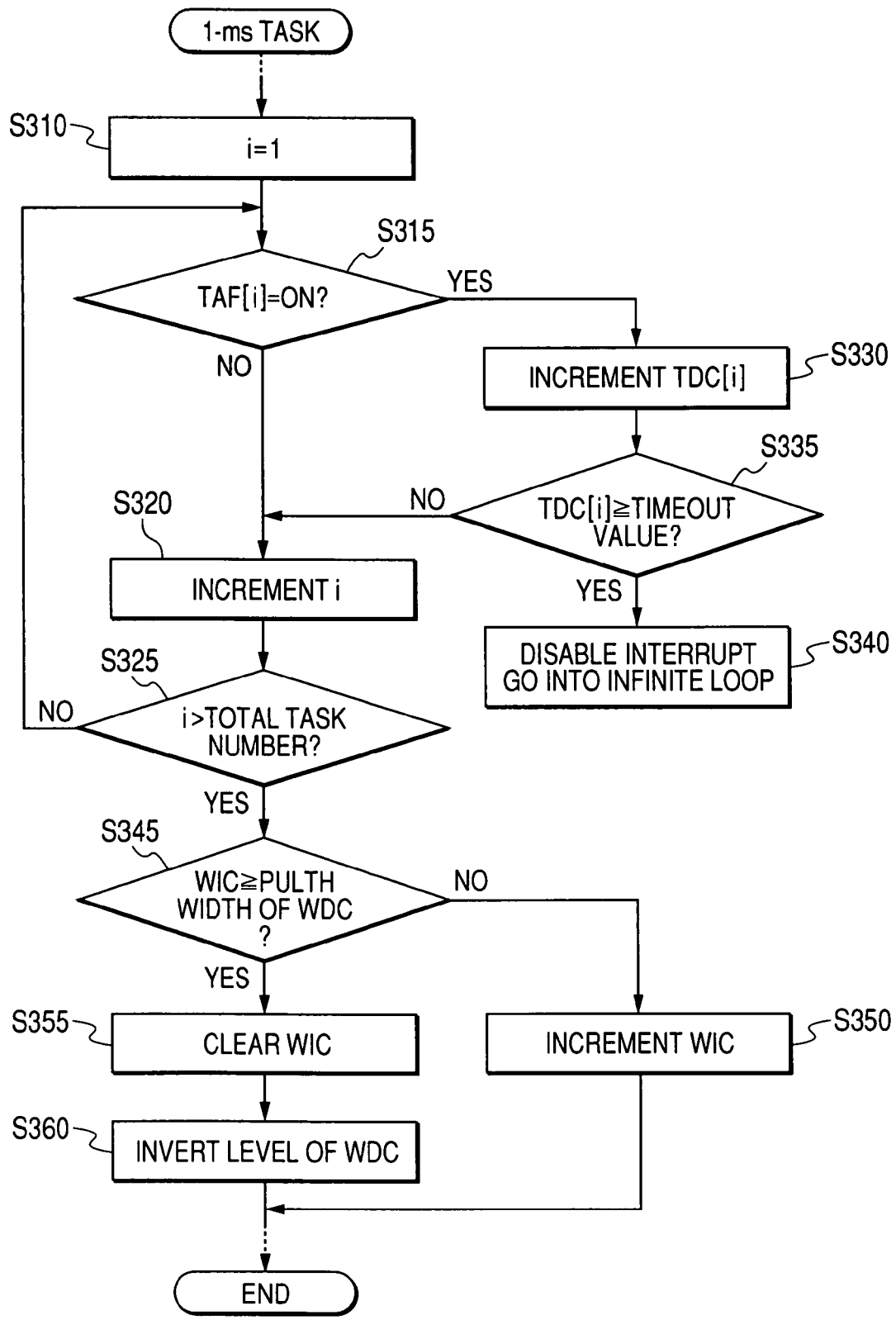
FIG. 5C is a flowchart schematically illustrating operations of the microcomputer in accordance with a 1-ms task illustrated in FIG. 3 according to the first embodiment.

When the RTOS 51 causes the CPU 21 to schedule the 1-ms task A to wake up in response to receiving a wakeup request of the 1-ms task A that occurs every cycle of 1 ms, the 1-ms task A causes the CPU 21 to execute the following operations (steps) illustrated in FIG. 5C.

Specifically, in step S310, the CPU 21 sets a count value of a number counter i to 1 as its initial value; the count value of the number counter i represents the number of the delay-period monitoring tasks. As the number counter i, one of the internal registers R of the CPU 21 or a software counter created by the CPU 21 can be used.

In step S315, the CPU 21 determines whether a wakeup request flag TAF [i] of one of the delay-period monitoring tasks corresponding to the number i represents the information of ON.

When it is determined that the wakeup request flag TAF [i] represents the information of OFF (the determination in step S315 is NO), the CPU 21 proceeds to step S320.

In step S320, the CPU 21 increments the number counter i by 1, and, in step S325, determines whether the count value of the number counter i exceeds the total number of the delay-period monitoring tasks.

When it is determined that the count value of the number counter i does not exceed the total number of the delay-period monitoring tasks (the determination in step S325 is NO), the CPU 21 returns to step S315, thereby repeatedly executing the operations in steps S315, S320, and S325.

Otherwise, when it is determined that the wakeup request flag TAF [i] represents the information of ON (the determination in step S315 is YES), the CPU 21 proceeds to step S330.

In step S330, the CPU 21 increments a count value of a wakeup delay-period counter TDC [i] of one of the delay-period monitoring tasks corresponding to the number i by 1.

Next, in step S335, the CPU 21 determines whether the count value of the wakeup delay-period counter TDC [i] is equal to or greater than a predetermined wakeup timeout period.

When it is determined that the count value of the wakeup delay-period counter TDC [i] is lower than the wakeup timeout period (the determination in step S335 is negative), the CPU 21 proceeds to step S320, thereby repeatedly executing the operations in steps S320 and S325.

Otherwise, when it is determined that the count value of the wakeup delay-period counter TDC [i] is equal to or greater than the wakeup timeout period (the determination in step S335 is affirmative), the CPU 21 determines that the program P is abnormally executed, proceeding to step S340.

In step S340, the CPU 21 disables any interrupts, and causes the program P to go into an infinite loop at step S340, in other words, the CPU 21 sets the destination of execution in step S340 to step S340 itself, thereby shifting its operation mode into a state waiting for reset.

Otherwise, when it is determined that the count value of the number counter i exceeds the total number of the delay-period monitoring tasks (the determination in step S325 is YES), the CPU 21 proceeds to step S345.

In step S345, the CPU 21 determines whether a count value of a counter WIC is equal to or greater than a predetermined time interval TI substantially corresponding to the pulse width of the pulsed WDC signal. Specifically, the time interval TI represents a time interval substantially between the temporally adjacent level transient timings of the rising and falling directions. As the count value of the counter WIC, one of the internal registers R of the CPU 21 or a software counter created by the CPU 21 can be used.

Note that the counter WIC is a counter for measuring the duration of the WDC kept in the same level. An initial vale of the counter WIC is set to 0.

When it is determined that the count value of the counter WIC is lower than the predetermined time interval TI substantially corresponding to the pulse width of the pulsed WDC signal (the determination in step S345 is NO), the CPU 21 proceeds to step S350.

In step S350, the CPU 21 increments the count value of the counter WIC, thereby proceeding the remaining processes in the 1-ms task.

Otherwise, when it is determined that the count value of the counter WIC is equal to or greater than the predetermined time interval TI substantially corresponding to the pulse width of the pulsed WDC signal (the determination in step S345 is YES), the CPU 21 proceeds to step S355.

In step S355, the CPU 21 clears the count value of the counter WIC to zero. Next, in step S360, the CPU 21 inverts the output level of the WDC signal, thus going to the remaining processes in the 1-ms task.

Specifically, in the 1-ms task A, the WDC signal is inverted in level at the regular time intervals TI shorter than the watchdog timeout period TO (see steps S345 to S360 in FIG. 5C).

In the 1-ms task A, in each of the individual delay-period monitoring tasks, the duration of the wakeup request flag TAF representing the information of ON, that is, the wakeup delay period of each of the individual delay-period monitoring tasks, is measured by the wakeup delay-period counter TDC (see steps S310 to S335 in FIG. 5C).

When the wakeup delay period of any one of the delay-period monitoring tasks is equal to or greater than the predetermined wakeup timeout period, the program P is determined to be abnormally executed by the CPU 21 (the determination in step S335 is YES). Then, the program P is caused to go into an infinite loop at step S340. This disables any intentional level inversions of the WDC signal after step S340.

Note that, in the first embodiment, a normal maximum value of the wakeup delay period of each of the delay-period monitoring tasks is configured to depend on the priority thereof. The lower the priority of a delay-period monitoring task is, the longer the wakeup delay period thereof is. In the first embodiment, therefore, it is preferable to set the wakeup timeout period to be a value slightly higher than the normal maximum value of the wakeup delay period of a delay-period monitoring task having the lowest priority in all of the delay-period monitoring tasks.

In addition, note that the instructions in step S120 in the delay-period monitoring task X, in steps S210 to S220 in the wakeup request program 52, and in steps S310 to S340 in the 1-ms task A for example correspond to the program-execution monitoring program.

Next, operations of the CPU 21 under the program-execution monitoring program illustrated in FIGS. 5A to 5C will be described hereinafter with reference to FIG. 6.

FIG. 6 illustrates an example in which a program P goes into an infinite loop in a delay-period monitoring task X so that it freezes or hangs up.

As illustrated in FIG. 6, a wakeup request R1 of a delay-period monitoring task Y lower in priority than the delay-period monitoring task X, which has already been waked up at time t20 (see R2), is generated (see step S110 in FIG. 5A). At that time, the information held in the wakeup request flag TAF [Y] is changed from OFF to ON (see step S120 in FIG. 5A and t21 in FIG. 6).

Thereafter, measurement of the wakeup delay period of the delay-period monitoring task Y, that is, counting-up of the wakeup delay-period counter TDC [Y] is started in each of the 1-ms task A (see steps S310 to S335 in FIG. 5C and t21 in FIG. 6) until the delay-period monitoring task Y is waked up (see steps S210 and S220 in FIG. 5B).

In this case, because the task X has been executed since the occurrence of the wakeup request of the delay-period monitoring task Y, wakeup of the delay-period monitoring task Y is delayed (see an interval between time t21 and t22 in FIG. 6). However, when the measured wakeup delay period TDC [Y] is set to lie within a normal range, that is, the measured wakeup delay period TDC [Y] is lower than the wakeup timeout period, the WDC signal is continued to be output from the microcomputer 3 to the watchdog timer 17 (see the negative determination in step S335).

Thereafter, when the execution of the delay-period monitoring task X is completed so that the delay-period monitoring task Y is waked up at time t22 in FIG. 6, the wakeup request flag TAF [Y] is changed from ON to OFF (see step S210 in FIG. 5B). This allows measurement of the wakeup delay period TDC [Y] to be terminated (see step S220 in FIG. 5B and step S320 in FIG. 5C).

In contrast, when the program P goes into an infinite loop in the delay-period monitoring task X, which has already been waked up at time 23 (see R2), a wakeup request R3 of the delay-period monitoring task Y generated at time t24 allows the information held in the wakeup request flag TAF [Y] to be changed from OFF to ON.

Thereafter, counting-up of the wakeup delay-period counter TDC [Y] is started in each of the 1-ms task A until the delay-period monitoring task Y is waked up.

In this case, because the program P goes into the infinite loop in the delay-period monitoring task X, the delay-period monitoring task Y is not waked up even after the measured wakeup delay period TDC [Y] reaches the wakeup timeout period (see steps S335 and S340 in FIG. 5C and t25 in FIG. 6).

This disables any level inversions of the WDC signal, and thereafter, the microcomputer 3 is reset by the reset signal output from the watchdog timer 17 of the power IC 7.

The operations associated with the delay-period monitoring tasks X and Y are effected when the delay-period monitoring task Y has the priority as high as the priority of the delay-period monitoring task X.

FIG. 6 illustrates an example in which a program P goes into an infinite loop in the delay-period monitoring task X lower in priority than the 1-ms task A. When a program P goes into an infinite loop in a delay-period monitoring task, which is equal to or higher in priority than the 1-ms task A, or is an interrupt, so that it freezes or hangs up, the 1-ms task A is not waked up. This disables the level inversion of the WDC signal, allowing the WDT 17 to reset the microcomputer 3.

Especially, even if specific delay-period monitoring tasks and/or all delay-period monitoring tasks each with a predetermined priority cannot be waked up because of the occurrence of a malfunction in the RTOS 51, they cannot be waked up in response to the occurrence of corresponding wakeup requests even after the corresponding wakeup delay periods TDC reach the wakeup timeout periods. This disables any level inversions of the WDC signal, and thereafter, the microcomputer 3 is reset by the reset signal output from the watchdog timer 17 of the power IC 7.

The ECU 1 of the first embodiment is configured to detect an abnormal execution of a program P in which a delay-period monitoring task, such as a time-synchronized task or a temporally asynchronous task, is not waked up even though a wakeup request corresponding to the delay-period monitoring task is generated due to a malfunction occurring in the RTOS 51. This allows the microcomputer 3 to be reset.

In addition, when a program P goes into an infinite loop in another task with priority equal to or higher than a delay-period monitoring task, another task is not waked up. This disables the level inversion of the WDC signal, allowing the WDT 17 to reset the microcomputer 3.

In the first embodiment, the 1-ms task A includes:

the operations in steps S310 to S330 for updating the wakeup delay-period counter TDC of a delay-period monitoring task requested to wake up;

the operation in step S335 for determining whether the count value of the wakeup delay-period counter TDC is equal to or greater than the wakeup timeout period; and the operations in steps S345 to 360 for resetting the watchdog timer 17.

When both measurement of the wakeup delay period and determination of the measured wakeup delay period are not carried out, reset of the watchdog timer 17 can be reliably disabled. Thus, it is possible to reliably reset the microcomputer 3 whenever the program-execution monitoring program cannot be normally carried out.

In the first embodiment, when it is determined that a program P is abnormally executed in step S335, the program can go into an infinite loop while any interrupts are disabled. This makes it possible to reliably prevent the microcomputer 3 in abnormal state from continuously executing the program.

Note that, in the first embodiment, step S340 corresponds both to an instruction for causing the microcomputer 3 to reset itself, and to an instruction for causing the microcomputer 3 to go to an infinite loop.

In the first embodiment, a process for activating the timer 29 required to periodically wake up the 1-ms task A is designed to be carried out in the initial task T1. Thus, even if the initial task is designed not to be a delay-period monitoring task, when the initial task T1 is abnormally executed, the 1-ms task A cannot be waked up. This disables the operations in steps S345 to 360 for inverting the output level of the WDC signal, making it possible to surely reset the microcomputer 3.

In the first embodiment, wakeup timeout periods of delay-period monitoring tasks to be used for the determination in step S335 can be individually set depending on the priorities of the delay-period monitoring tasks. Specifically, the wakeup timeout periods of the delay-period monitoring tasks can be set such that the higher the priority of a delay-period monitoring task is, the shorter the wakeup timeout period thereof is. This makes it possible to rapidly detect an abnormal execution of a program P.

Second Embodiment

The delay-period monitoring tasks include a repeatedly wakeup-requestable task for which a wakeup request is repeatedly generated between output of a first wakeup request to the RTOS 51 and wakeup (start of execution) of the repeatedly wakeup-requestable task.

Figure 7C:
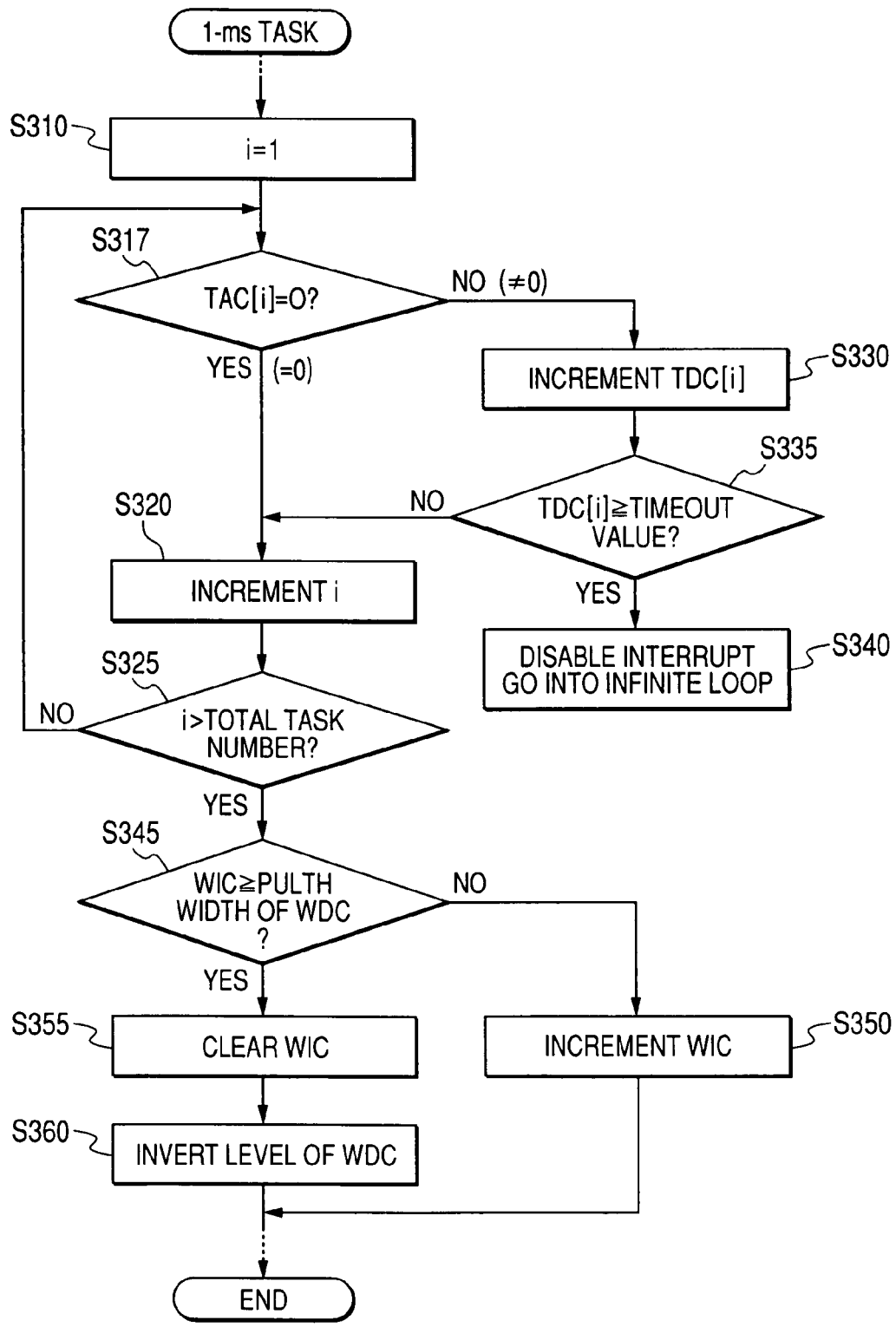
FIG. 7C is a flowchart schematically illustrating operations of the microcomputer in accordance with a 1-ms task according to the second embodiment.

Thus, in order to detect an abnormal execution of a program P containing repeatedly wakeup-requestable tasks as delay-period monitoring tasks, a program-execution monitoring program according to a second embodiment of the present invention is designed to cause the CPU 21 to execute program-execution monitoring processes illustrated in FIGS. 7A to 7C in place of FIGS. 5A to 5C.

Like reference characters are assigned to like steps in FIGS. 5A to 5C and 7A to 7C, and therefore, descriptions of the like steps will be therefore omitted.

As illustrated in FIG. 7A, an event corresponding to a repeatedly wakeup-requestable task (delay-period monitoring task) Y1 of a program P, such as a time-synchronized event based on the timer 29, an angle-synchronized event based on the pulse signal output from the crank angle sensor, or an irregular event, occurs. At that time, the wakeup request program 52 causes the CPU 21 to generate a wakeup request of the delay-period monitoring task Y1 in step S110.

Next, the wakeup request program 52 causes the CPU 21 to determine whether a return value sent from the RTOS 51 represents OK in step S130. When it is determined that the return value sent from the RTOS 51 represents OK (the determination in step S130 is affirmative), it is determined that the currently generated wakeup request is honored by the RTOS 51, thus causing the CPU 21 to proceed to step S140.

In step S140, the wakeup request program 52 causes the CPU 21 to increment a wakeup-request number counter TAC [Y1] by 1, causing the CPU 21 to exit the processes illustrated in FIG. 7A.

As the wakeup-request number counter TAC [Y1], one of the internal registers R of the CPU 21 or a software counter created by the CPU 21 can be used.

Note that the wakeup-request number counter TAC [Y1] is a counter for counting the number indicative of differences between the number of wakeup requests of the delay-period monitoring task Y1 and that of wakeups of the delay-period monitoring task Y1. In other words, the wakeup-request number counter TAC [Y1] is a counter for counting the number of the remaining wakeups of the delay-period monitoring task Y1 that have not been executed yet though corresponding wakeup requests are generated. An initial vale of the wakeup-request number counter TAC [Y1] is set to 0.

Otherwise, when it is determined that the return value sent from the RTOS 51 does not represent OK, such as ERROR (the determination in step S130 is negative), it is determined that the currently generated wakeup request is not honored by the RTOS 51, thus causing the CPU 21 to proceed to step S150.

In step S150, the wakeup request program 52 causes the CPU 21 to determine whether the count value of the wakeup-request number counter TAC [Y1] is equal to or greater than a predetermined upper limit number [Y1] for the delay-period monitoring task Y1.

When it is determined that the count value of the wakeup-request number counter TAC [Y1] is equal to or greater than the predetermined upper limit number [Y1] (the determination in step S150 is YES), the wakeup request program 51 causes the CPU 21 to exit the processes illustrated in FIG. 7A. Note that the predetermined upper limit number [Y1] represents an upper limit of the number of repeated wakeup requests for the delay-period monitoring task Y1.

Otherwise, when it is determined that the count value of the wakeup-request number counter TAC [Y1] is lower than the predetermined upper limit number [Y1] (the determination in step S150 is NO), the wakeup request program 51 causes the CPU 21 to proceed to step S160.

In step S160 like step S340, the wakeup request program 51 causes the CPU 21 to:

disable any interrupts; and cause the program P to go into an infinite loop at step S160.

This allows, after the watchdog timeout period TO elapses, the watchdog timer 17 to reset the microcomputer 3.

The RTOS 51 causes the CPU 21 to schedule the delay-period monitoring task Y1 to wake up when no tasks higher in priority than the delay-period monitoring task Y1 are executed.

When waking up, the delay-period monitoring task Y1 at its leading address portion causes the CPU 21 to decrement the count value of the wakeup-request number counter TAC [Y1] by 1 in step S215.

Next, the delay-period monitoring task Y1 causes the CPU 21 to clear the count value of the wakeup delay-period counter TDC [Y1] to zero (0) in step S220. Thereafter, the delay-period monitoring task Y1 at its remaining address portion causes the CPU 21 to execute the original task allocated to the delay-period monitoring task Y1.

When the RTOS 51 causes the CPU 21 to schedule the 1-ms task A to wake up in response to receiving a wakeup request of the 1-ms task A that occurs every cycle of 1 ms, the 1-ms task A causes the CPU 21 to execute the operations (steps) illustrated in FIG. 7C. As compared with the operations illustrated in FIG. 5C, the CPU 21 executes the operations identical to those in steps S310 to S360 of FIG. 5C except for the operation S315. Specifically, the CPU 21 according to the second embodiment executes the operation in step S317 of FIG. 7C in place of that in step S315.

In step S317, the CPU 21 determines whether a wakeup-request number counter TAC [i] of one of the delay-period monitoring tasks corresponding to the number i is zero (0).

When it is determined that the wakeup-request number counter TAC [i] is zero (0) (the determination in step S317 is YES), the CPU 21 proceeds to step S320 set forth above.

Otherwise, when it is determined that the wakeup-request number counter TAC [i] is not zero (0) (the determination in step S317 is NO), the CPU 21 proceeds to step S330 set forth above.

Specifically, in the second embodiment, in each of the individual repeatedly wakeup-requestable tasks (delay-period monitoring tasks), the count value of the wakeup-request number counter TAC in place of the wakeup request flag TAF is incremented by 1 in response to the occurrence of a wakeup request of the delay-period monitoring task Y1 (see step S140). In addition, the count value of the wakeup-request number counter TAC is decremented by 1 in response to start of execution of the delay-period monitoring task Y1 (see step S215). This allows the count value of the wakeup-request number counter TAC to show the number of the remaining wakeups of the delay-period monitoring task Y1.

Next, operations of the CPU 21 under the program-execution monitoring program illustrated in FIGS. 7A to 7C will be described hereinafter with reference to FIG. 8. Note that, in FIG. 8, a delay-period monitoring task Y1 is at least a repeatedly wakeup-requestable task, and the delay-period monitoring task Y1 is lower in priority than 1-ms task A and a delay-period monitoring task X.

As illustrated in FIG. 8, a wakeup request R11 and a next wakeup request R12 of the delay-period monitoring task Y1 after the delay-period monitoring task X is waked up at time t30 (see R10) are sequentially generated at time t31 and time t32. In each of the wakeup requests R1 and R12, wakeup for the delay-period monitoring task Y1 is waited because of the delay-period monitoring task X being executed. At each of time t31 and time t32, the count value of the wakeup-request number counter TAC [Y1] is incremented by 1.

In each of the 1-ms task A for each of the wakeup requests R11 and R12 of the delay-period monitoring task Y1, when the wakeup-request number counter TAC [Y1] is not to zero (0) (NO in step S317), the wakeup delay-period counter TDC [Y1] is incremented by 1 (see step S330). When the delay-period monitoring task Y1 corresponding to the wakeup request R11 is waked up at time t33, the count value of the wakeup delay-period counter TDC [Y1] is cleared to zero (0) (step S220). Similarly, when the delay-period monitoring task Y1 corresponding to the wakeup request R12 is waked up, the count value of the wakeup delay-period counter TDC [Y1] is cleared to zero (0) (step S220).

These processes allows, in the delay-period monitoring task Y1, the wakeup delay period between output of the wakeup request R1 thereof (see time t31) and the wakeup (the first start of execution) of the delay-period monitoring task Y1 (see time t33) corresponding to the wakeup request R11 to be measured as the count value of the wakeup delay-period counter TDC [Y1].

Thereafter, until the count value of the wakeup-request number counter TAC [Y1] becomes zero (0), the wakeup delay period between a current wakeup of the delay-period monitoring task Y1 corresponding to a current wakeup request and the previous wakeup thereof corresponding to the previous wakeup request is repeatedly measured as the count value of the wakeup delay-period counter TDC [Y1].

When each of the measured wakeup delay periods TDC [Y1] is lower than the wakeup timeout period, the WDC signal is continued to be output from the microcomputer 3 to the watchdog timer 17 (see the negative determination in step S335).

Similarly, a wakeup request R21 and a next wakeup request R22 of the delay-period monitoring task Y1 after the delay-period monitoring task X is waked up at time t40 (see R20) are sequentially generated at time t41 and time t42.

In this case, the wakeup delay period between output of the wakeup request R21 thereof (see time t41) and the wakeup (the first start of execution) of the delay-period monitoring task Y1 (see time t43) corresponding to the wakeup request R21 to be measured as the count value of the wakeup delay-period counter TDC [Y1].

After execution of the delay-period monitoring task Y1 at time t44, when a malfunction occurs in the RTOS 51, the delay-period monitoring task Y1 corresponding to the wakeup request R22 is not waked up even after the measured wakeup delay period TDC [Y1] reaches the wakeup timeout period (see steps S335 and S340 in FIG. 7C and t45 in FIG. 8).

This disables any level inversions of the WDC signal, and thereafter, the microcomputer 3 is reset by the reset signal output from the watchdog timer 17 of the power IC 7.

As described above, for example, when wakeup of the repeatedly wakeup-requestable task is requested at two or more times, the first wakeup request and the second wakeup request are sequentially generated. Thereafter, the repeatedly wakeup-requestable task is executed at the first time corresponding to the first wakeup request, and the repeatedly wakeup-requestable task is sequentially executed at the second time corresponding to the second wakeup request.

Specifically, when wakeup of the repeatedly wakeup-requestable task is requested for the second and subsequent times, a wakeup delay period according to the second embodiment between a current wakeup of the repeatedly wakeup-requestable task corresponding to a current wakeup request and the previous wakeup thereof corresponding to the previous wakeup request is repeatedly measured as the count value of the wakeup delay-period counter TDC [Y1].

When wakeup of the repeatedly wakeup-requestable task is requested for the second and subsequent times, a wakeup delay period according to the first embodiment between output of each wakeup request of the repeatedly wakeup-requestable task and execution thereof corresponding one of the wakeup requests is greater than the corresponding wakeup delay period according to the second embodiment.

Accordingly, it is possible to simplify the software logic of the program-execution monitoring program according to the second embodiment as compared with that of the program-execution monitoring program according to the first embodiment.

In the second embodiment, therefore, even if a malfunction occurs in the RTOS 51 so that the repeatedly wakeup-requestable task is not normally waked up at predetermined repeat times, it is possible to simply reliably detect it, thereby resetting the microcomputer 3.

In addition, in the second embodiment, during the RTOS 51 normally operating, when wakeup of a repeatedly wakeup-requestable task whose count number of the wakeup-request number counter TAC is lower than the upper limit number therefor is requested, the RTOS 51 is configured to send the return value indicative of OK to the wakeup request program 52 (see step S130 in FIG. 7A).

In contrast, during the RTOS 51 abnormally operating, when wakeup of a repeatedly wakeup-requestable task whose count number of the wakeup-request number counter TAC is lower than the upper limit number therefor is requested, the RTOS 51 is configured to send the return value indicative of ERROR to the wakeup request program 52 (see "NO" in step S130 of FIG. 7A).

In this case, in the second embodiment, it is possible to cause a corresponding program P to go into an infinite loop while disabling any interrupts. This can prevent the output level of the WDC signal from being inverted.

As described above, in the second embodiment, it is possible to detect the occurrence of a malfunction in the RTOS 51 that disables wakeup requests to be handled, thus implementing the reset of the microcomputer 3.

Note that the processes illustrated in FIGS. 7A to 7C can be applied in cases of delay-period monitoring tasks, which cannot or need not be repeatedly requested for wakeup, being used in place of the repeatedly wakeup-requestable tasks.

As a modification, in step S150 of FIG. 7A, the wakeup request program 52 can cause the CPU 21 to determine whether the count value of the wakeup-request number counter TAC [Y1] is zero (0).

When it is determined that the count value of the wakeup-request number counter TAC [Y1] is zero (0), it is determined that the RTOS 51 is in abnormal state. Then, the wakeup request program 51 causes the CPU 21 to proceed to step S160.

In the modification, when a new wakeup request of a repeatedly wakeup-requestable task whose count value of the wakeup-request number counter TAC is zero (0) is generated, if the new wakeup request is not handled by the RTOS 51 (NO in step S130), it is determined that the RTOS 51 is in abnormal state. Accordingly, the wakeup request program 51 causes the CPU 21 to cause the corresponding program P to go into an infinite loop while disabling any interrupts, which allows the watchdog timer 17 to reset the microcomputer 3.

In step S150 illustrated in FIG. 7A, it is necessary to select one of the upper limit values depending on each delay-period monitoring task (each repeatedly wakeup-requestable task), but, in the modification of the step S150 illustrated in FIG. 7A, it is unnecessary to consider the upper limits of the respective delay-period monitoring tasks (repeatedly wakeup-requestable tasks). This can prevent the select of one of the upper limit values depending on each delay-period monitoring task (each repeatedly wakeup-requestable task), making it possible to simplify the operation in step S150.

Third Embodiment

In the program-execution monitoring program according to the each of the first and second embodiment, the occurrence of hang-up of a program in a delay-period monitoring task because of the program going into an infinite loop is configured to be detected as follows:

Specifically, when the wakeup delay period of another one delay-period monitoring task equal to or lower in priority than the delay-period monitoring task is equal to or greater than the wakeup timeout period, it is possible to detect that the occurrence of hang-up of a program in the delay-period monitoring task.

For this reason, lets us consider, as a delay-period monitoring task, a lowest-priority task, except for the idle task, that is lower in priority than the lowest priority of a time-synchronized task in all of the time-synchronized tasks. As an example of such a lowest priority task, there is a temporally asynchronous task, such as, an event task designed to be requested to wake up at a timing occurring independently of the clock frequency of the CPU 21 and the angular positions of the crankshaft.

In the third embodiment, the delay-period monitoring tasks may include such a temporally asynchronous task with the lowest priority. In this case, even if when hang-up occurs in such a temporally asynchronous task with the lowest priority, it is difficult to detect the hang-up of the program. This is because, even if hang-up of a program occurs in a temporally asynchronous task with the lowest priority, the wakeup delay period of each of the remaining delay-period monitoring tasks is independent of the hang-up of the program in the temporally asynchronous task with the lowest priority.

Thus, in order to detect such temporally asynchronous tasks with the lowest priority, a program-execution monitoring program according to a third embodiment of the present invention is designed to cause the CPU 21 to execute program-execution monitoring processes illustrated in FIGS. 9A and 9B in addition to the program-execution monitoring processes illustrated in FIGS. 7A to 7C.

The program-execution monitoring processes illustrated in FIGS. 9A and 9B allow the CPU 21 to:

measure the execution time of each of the temporally asynchronous tasks with the lowest priority, which represents an interval between start of execution of each of the temporally asynchronous tasks with the lowest priority and completion thereof;

determine whether the measured execution time is equal to or greater than a predetermined execution timeout value; and disable the level conversion of the WDC signal when it is determined that the measured execution time is equal to or greater than the predetermined execution timeout value.

Note that such a temporally asynchronous task with the lowest priority as a target for measurement of the execution time thereof will be referred to as "execution time monitoring task" hereinafter.

If there are a plurality of execution time monitoring tasks, such as tasks TA and TB, the program-execution monitoring processes illustrated in FIGS. 9A and 9B allow the CPU 21 to reliably detect the tasks TA and TB.

In the third embodiment, sequential numbers beginning with 1 are assigned to the plurality of execution time monitoring tasks.

Specifically, like the second embodiment, the RTOS 51 causes the CPU 21 to schedule each of execution time monitoring tasks to wake up when no tasks higher in priority than each of the execution time monitoring tasks are run.

When waking up, an execution time monitoring task X at its leading address portion causes the CPU 21 to execute the operations in steps S215 and S220 illustrated in FIG. 7A.

Thereafter, the execution time monitoring task X causes the CPU 21 to clear an execution time counter TEC [X] to be zero (0) in step S230.

As the execution time counter TEC [X], one of the internal registers R of the CPU 21 or a software counter created by the CPU 21 can be used.

Note that the execution time counter TEC [X] is a counter for counting the execution time of the execution time monitoring task X, and an initial vale of the execution time counter TEC [X] is set to 0.

Next, the execution time monitoring task X causes the CPU 21 to change information in form of a bit held in an executing flag TEF [X] corresponding to the execution time monitoring task X from OFF to ON in step S240.

The executing flag TEF is for example set by software in the microcomputer 3 each time the microcomputer 3 is started, and the information indicative of OFF is set as default information of the executing flag TEF corresponding to each of the execution time monitoring tasks.

Thereafter, the execution time monitoring task X at its remaining address portion causes the CPU 21 to execute the original task allocated to the execution time monitoring task X.

In addition, the execution time monitoring task X at its final address portion causes the CPU 21 to change the information held in the executing flag TEF from ON to OFF in step S250.

When the RTOS 51 causes the CPU 21 to schedule the 1-ms task A to wake up in response to receiving a wakeup request of the 1-ms task A that occurs every cycle of 1 ms, the 1-ms task A causes the CPU 21 to execute the operations (steps) illustrated in FIG. 9B.

Specifically, in step S410, the CPU 21 sets a count value of a number counter j to 1 as its initial value; the count value of the number counter j represents the number of the execution time monitoring tasks. As the number counter j, one of the internal registers R of the CPU 21 or a software counter created by the CPU 21 can be used.

In step S415, the CPU 21 determines whether an executing flag TEF [j] of one of the delay-period monitoring tasks corresponding to the number j represents the information of ON.

When it is determined that the executing flag TEF [j] represents the information of OFF (the determination in step S415 is NO), the CPU 21 proceeds to step S420.

In step S420, the CPU 21 increments the number counter j by 1, and, in step S425, determines whether the count value of the number counter j exceeds the total number of the execution time monitoring tasks.

When it is determined that the count value of the number counter j does not exceed the total number of the execution time monitoring tasks (the determination in step S425 is NO), the CPU 21 returns to step S415, thereby repeatedly executing the operations in steps S415, S420, and S425.

Otherwise, when it is determined that the executing flag TEF [j] represents the information of ON (the determination in step S415 is YES), the CPU 21 proceeds to step S430.

In step S430, the CPU 21 increments a count value of an execution time counter TEC [j] of one of the execution time monitoring tasks corresponding to the number j by 1.

Next, in step S435, the CPU 21 determines whether the count value of the execution time counter TEC [j] is equal to or greater than a predetermined execution timeout value.

When it is determined that the count value of the execution time counter TEC [j] is lower than the predetermined execution timeout value (the determination in step S435 is NO), the CPU 21 proceeds to step S420, thereby repeatedly executing the operations in steps S420 and S425.

Otherwise, when it is determined that the count value of the execution time counter TEC [j] is equal to or greater than the predetermined execution timeout value (the determination in step S435 is YES), the CPU 21 determines that the program P is abnormally executed, proceeding to step S440.

In step S440, like step S340, the CPU 21 disables any interrupts, and causes the program P to go into an infinite loop at step S440, in other words, the CPU 21 sets the destination of execution in step S440 to step S440 itself, thereby shifting its operation mode into a state waiting for reset.

Specifically, in the 1-ms task A, in each of the individual execution time monitoring tasks, the duration of the executing flag TEF representing the information of ON, that is, the execution time of each of the individual execution time monitoring tasks, is measured by the execution time counter TEC (see steps S410 to S435 in FIG. 9B).

When the execution time of any one of the execution time monitoring tasks is equal to or greater than the predetermined execution timeout period, the program P is determined to be abnormally executed by the CPU 21 (the determination in step S435 is YES). Then, the program P is caused to go into an infinite loop at step S440. This disables any intentional level inversions of the WDC signal after step S440.

As described above, in the third embodiment, it is assumed that there are no time-synchronized tasks (delay-period monitoring tasks) with the lowest priority in all of the delay-period monitoring tasks. In this assumption, even if a program hangs up or freezes in one of the execution time monitoring tasks, it is possible to reliably detect the hang-up when a period corresponding to the execution timeout value has elapsed since the start of one of the execution time monitoring tasks. This is because it is determined that the program P is abnormally executed in step S435.

In the third embodiment, the instructions in step S230 to 250 in the execution time monitoring task X and in steps S410 to S440 in the 1-ms task A for example correspond to the program-execution monitoring program.

As a modification of the third embodiment, if there is no time-synchronized tasks (delay-period monitoring tasks) with the lowest priority except for the idle task T2 in all of the delay-period monitoring tasks, in place of the structure illustrated in FIGS. 9A and 9B, each of the programs P can be designed to:

generate a time-synchronized task with the lowest priority independently of engine control; and regard the generated time-synchronized task with the lowest priority independently of engine control as a delay-period monitoring task.

In the modification, when a program hangs up or freezes in one of the temporally asynchronous tasks, because the generated time-synchronized task with the lowest priority is not executed (see task Y in FIG. 6), it is possible to detect the hang-up of the program in step S335 (see FIG. 5C or 7C).

Note that, if there is a time-synchronized task (delay-period monitoring task) with the lowest priority for control of the engine, it is possible to regard the time-synchronized task (delay-period monitoring task) with the lowest priority as a delay-period monitoring task. In this case, as described above, when a program hangs up or freezes in one of the temporally asynchronous tasks, because the generated time-synchronized task with the lowest priority is not executed (see task Y in FIG. 6), it is possible to detect the hang-up of the program in step S335 (see FIG. 5C or 7C).

Fourth Embodiment

A fourth embodiment of the present invention will be described hereinafter with reference to FIGS. 10 and 11.

In the fourth embodiment, an ECU has the following first to fourth different structural points as compared with the ECU according to either second or third embodiment.

Specifically, as the first structural different point, one or more time-synchronized tasks are set to execution interval monitoring tasks. The execution interval monitoring tasks are designed to allow measurement of the intervals between the start of execution of each execution interval monitoring task and that of execution of a next execution interval monitoring task temporally adjacent to each execution interval monitoring task described hereinafter.

Figure 10A:
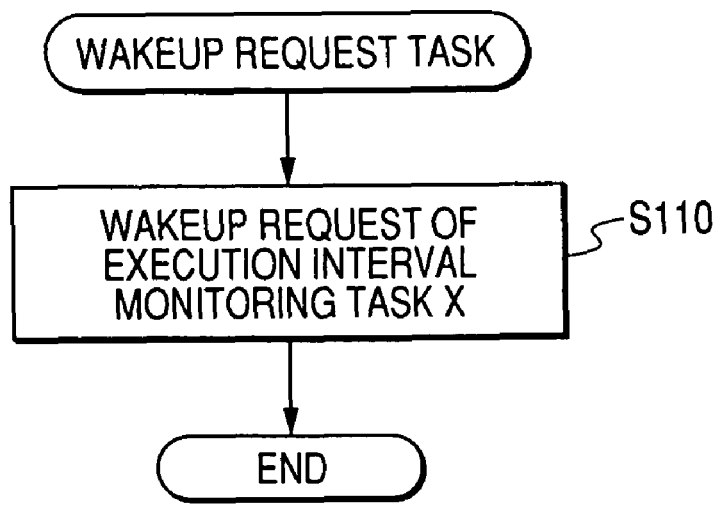
FIG. 10A is a flowchart schematically illustrating operations of the microcomputer in accordance with a wakeup request task according to a fourth embodiment of the present invention.

As the second structural different point, for an execution interval monitoring task [X], the wakeup request task 52 works to cause the CPU 21 to only generate a wakeup request of the execution interval monitoring task X in step S110 (see FIG. 10A). Note that, for the delay-period monitoring tasks, the wakeup request program 52 works to cause the CPU 21 to execute the operations in steps S110 to S140 of FIG. 7A.

Figure 10B:
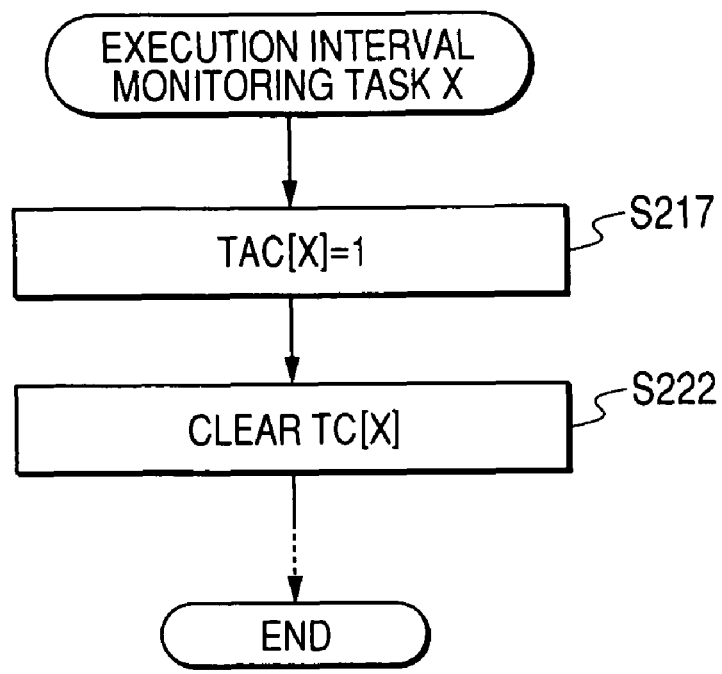
FIG. 10B is a flowchart schematically illustrating operations of the microcomputer in accordance with an execution interval monitoring task according to the fourth embodiment of the present invention.

As third structural different point, the execution interval monitoring task X at its leading address portion causes the CPU 21 to set the wakeup request flag TAF [X] to 1 in step S217 of FIG. 10B. Next, the execution interval monitoring task X causes the CPU 21 to clear a count value of a counter TC [X] to zero (0) in step S222. Thereafter, the execution interval monitoring task X at its remaining address portion causes the CPU 21 to execute the original task allocated to the execution interval monitoring task X.

As the counter TC [X], one of the internal registers R of the CPU 21 or a software counter created by the CPU 21 can be used.

Note that the counter TC [X] is a counter for:

measuring, when the task X is set to an execution interval monitoring task, the execution intervals between the temporally adjacent monitoring tasks [X]; or measuring, when the task X is set to a task different from the execution interval monitoring tasks, the wakeup delay period of the task X.

Figure 11:
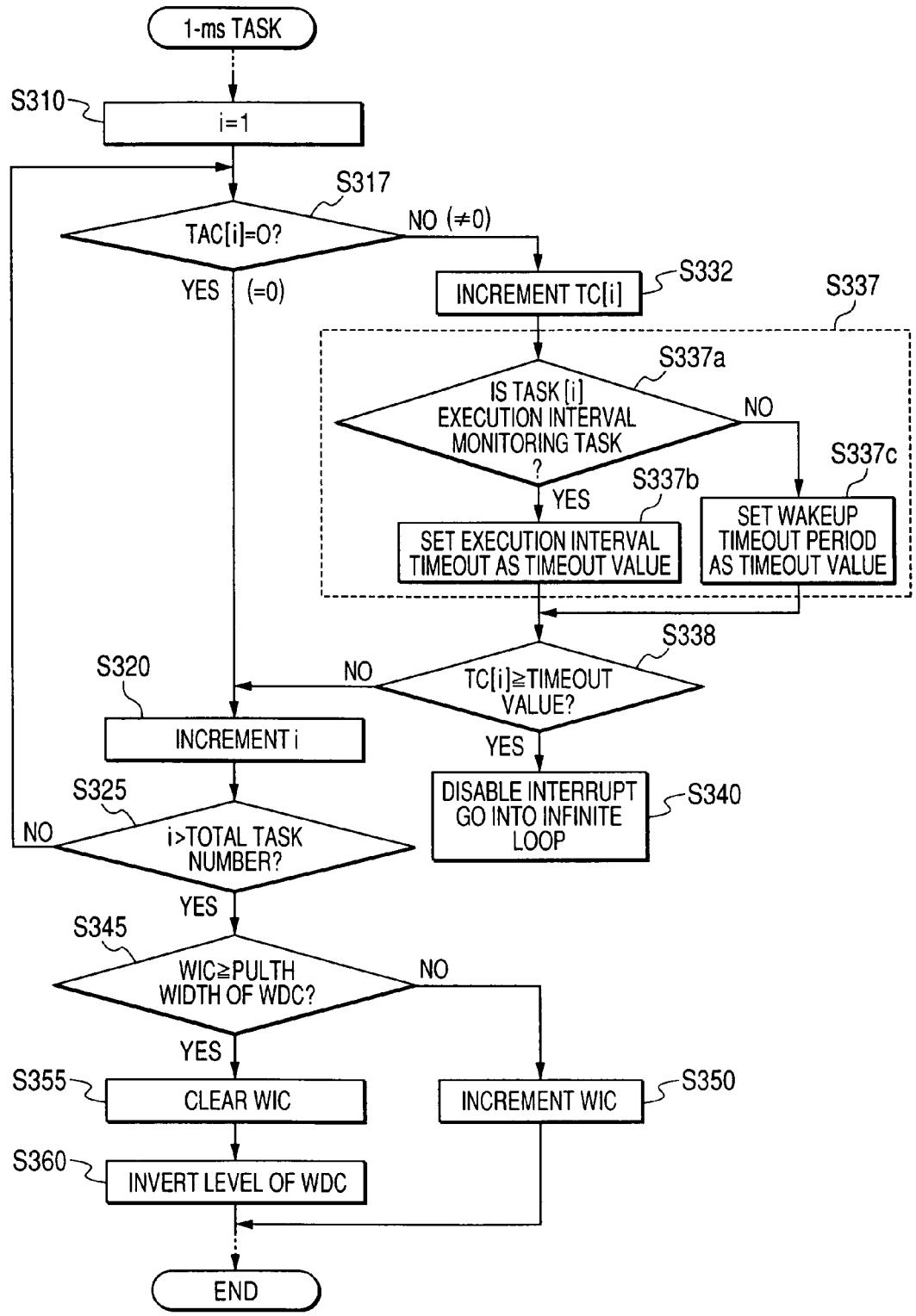
FIG. 11 is a flowchart schematically illustrating operations of the microcomputer in accordance with a 1-ms task according to the fourth embodiment.

As the fourth structural different point, the 1-ms task A causes the CPU 21 to execute the operations illustrated in FIG. 11 in place of the operations in FIG. 7C. Like reference characters are assigned to like steps in FIGS. 7C and 11, and therefore, descriptions of the like steps will be therefore omitted.

In the fourth embodiments, sequential numbers beginning with 1 are assigned to the delay-period monitoring tasks and the execution interval monitoring tasks.

In addition, in step S325, it is determined whether the count value of the number counter i exceeds the total number of the delay-period monitoring tasks and the execution interval monitoring tasks.

As illustrated in FIG. 11, as compared with the operations in FIG. 7C, the 1-ms task A according to the fourth embodiment causes the CPU 21 to execute: the operation in step S332 in place of step S330; the operation in step S338 in place of step S335; and the operation in step S337 between steps S332 and S338.

After the negative determination in step S317, the CPU 21 increments a count value of a counter TC [i] of one of the delay-period monitoring tasks and the execution interval monitoring tasks corresponding to the number i by 1 in step S332.

Next, in step S337, the CPU 21 determines whether one of the delay-period monitoring tasks and the execution interval monitoring tasks corresponding to the number i is an execution interval monitoring task in step S337a.

When it is determined that one of the delay-period monitoring tasks and the execution interval monitoring tasks corresponding to the number i is an execution interval monitoring task (the determination in step S337a is YES), the CPU 21 proceeds to step S337b.

In step S337b, the CPU 21 sets an execution interval timeout value to a timeout value for comparing the count value of the counter TC [i].

Otherwise, when it is determined that one of the delay-period monitoring tasks and the execution interval monitoring tasks corresponding to the number i is not an execution interval monitoring task (the determination in step S337a is NO), the CPU 21 proceeds to step S337c.

In step S337c, the CPU 21 sets the wakeup timeout period, used in step S335, to a timeout value for comparing the count value of the counter TC [i].

Note that information indicative of the relationship between each of the serial numbers and a corresponding one of the delay-period monitoring tasks and the execution interval monitoring tasks has been stored in, for example, the ROM 23. That is, the CPU 23 executes the determination in step S337a using the information stored in the ROM 23.

Next, in step S338, the CPU 21 determines whether the count value of the counter TC [i] is equal to or greater than the timeout value set in step S337.

When it is determined that the count value of the counter TC [i] is lower than the timeout value set in step S337 (the determination in step S338 is NO), the CPU 21 proceeds to step S320, thereby repeatedly executing the operations in steps S320 and S325.

Otherwise, when it is determined that the count value of the counter TC [i] is equal to or greater than the timeout value set in step S337 (the determination in step S338 is YES), the CPU 21 determines that the program P is abnormally executed, proceeding to step S340.

In step S340, the CPU 21 disables any interrupts, and causes the program P to go into an infinite loop at step S340, in other words, the CPU 21 sets the destination of execution in step S340 to step S340 itself, thereby shifting its operation mode into a state waiting for reset.

As described above, in the execution interval monitoring tasks, the execution intervals therebetween are measured (see step S332). When one of the execution intervals is equal to or greater than the execution interval timeout value, it is determined that the program P is abnormally executed (see step S338), so the microcomputer 3 is reset by the watchdog timer 17.

On the other hand, in the delay-period monitoring tasks, like the second and third embodiments, the wakeup delay periods thereof are measured (see step S332). When one of the wakeup delay periods is equal to or greater than the wakeup timeout period, it is determined that the program P is abnormally executed (see step S338), so the microcomputer 3 is reset by the watchdog timer 17.

According to the fourth embodiment, even if corruption of data associated with the time synchronous scheduler 52a of the wakeup request program 52 stored in the RAM 25 occurs due to disturbances, such as radio noise, it is possible to detect such an abnormal state in the microcomputer 3. This allows the microcomputer 3 to be reset.

Note that the instructions in step S140 in FIG. 7A, in steps S215 and S220 in FIG. 7B, and in steps S310 to S3338 in FIG. 11 correspond to the program-execution monitoring program.

In the fourth embodiment, part of the time-synchronized tasks can be set to the execution interval monitoring tasks, and the remaining time-synchronized tasks and temporally asynchronous tasks can be set to the delay-period monitoring tasks.

In this modification, it is preferable that, as the delay-time monitoring tasks, the temporally asynchronous tasks are used, and all or part of the time-synchronized tasks are set to the execution interval monitoring tasks. This can easily give the microcomputer 3 both a high malfunction detecting capability and a processing load reducing capability. Specifically, lets us compare the operations to measure the execution intervals between the time-synchronized tasks or the temporally asynchronous tasks with those to measure the wakeup delay periods thereof.

In the former operations, as illustrated in FIG. 10A for example, the wakeup request program 52 can only generate the wakeup request of each of the time-synchronized tasks or the temporally asynchronous tasks. In other words, the wakeup request program 52 need not perform the on operations of the flag TAF and/or increment operations of the counter TA.

For this reason, it is possible to reduce the processing load of the microcomputer 3 using the former operations as compared with using the latter operations.

Fifth Embodiment

A fifth embodiment of the present invention will be described hereinafter with reference to FIGS. 12 and 13.

In the fifth embodiment, an ECU has the following first and second different structural points as compared with the ECU according to any one of the first to fourth embodiments.

Specifically, as the first structural different point, a monitoring task of a program P lower in priority than the idle task T2 is added. In the monitoring task, as illustrated in FIG. 12B, an instruction in step S610 for causing the CPU 21 to disable any interrupts to thereby cause the program P to go into an infinite loop has been contained. In other words, like step S340, the instruction in step S610 causes the CPU 21 to set the destination of execution in step S610 to step S610.

Figure 12A:
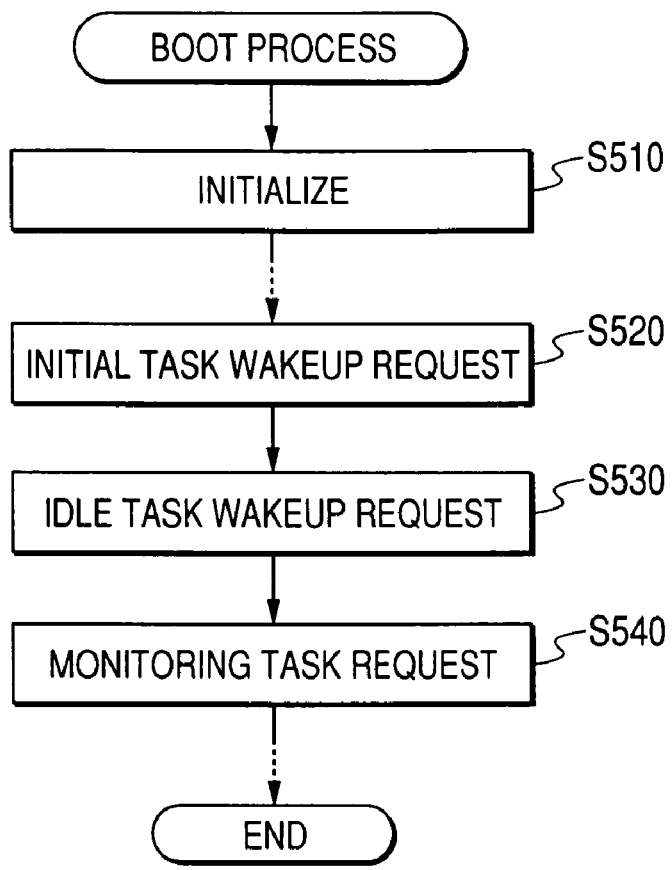
FIG. 12A is a flowchart schematically illustrating operations of the microcomputer in accordance with a boot process program in the RTOS according to a fifth embodiment of the present invention.
Figure 12B:
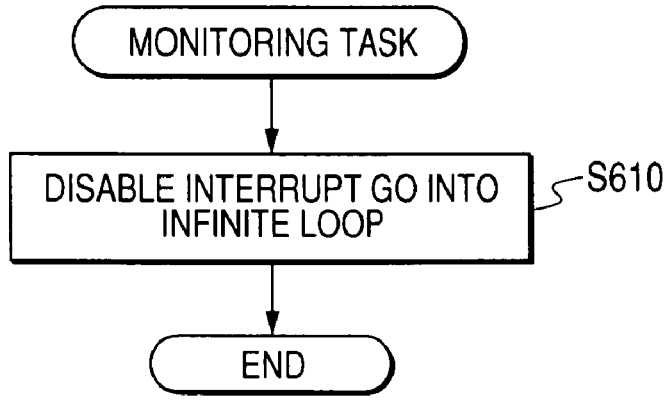
FIG. 12B is a flowchart schematically illustrating operations of the microcomputer in accordance with a monitoring task according to the fifth embodiment.

As the second structural different point, as illustrated in FIG. 12A, a boot process program in the RTOS 51 causes the CPU 21 to initialize the RAM 25 in step S510, and to request the initial task T1 to wake up in step S520.

Next, the boot process program in the RTOS 51 causes the CPU 21 to request the idle task T2 to wake up in step S530, and to request the monitoring task to wake up in step S540. Thereafter, the boot process program in the RTOS 51 causes the CPU 21 to execute other operations required to boot the microcomputer 3.

As the control tasks 50, the wakeup request program 52 set forth above can cause the CPU 21 to request them accordingly after completion of the operations in steps S510 to S540.

In the microcomputer 3 of the ECU 1 under normal operating conditions according to the fifth embodiment, as illustrated in FIG. 13A, the initial task T1 being requested for wakeup is immediately waked up by the CPU 21 in accordance with a task scheduler of the RTOS 51 at time t50.

The idle task T2 being requested for wakeup is waked up by the CPU 21 in accordance with the task scheduler immediately after the completion of execution of the initial task T1 at time t51 while allowing interrupts of the control tasks 50 (see time t52 and time t53).

The monitoring task being requested for wakeup in step S540 is basically configured to be waked up based on its priority by the CPU 21 in accordance with the task scheduler. However, because the monitoring task is lower in priority than the idle task, the monitoring task cannot be waked up unless the program P is abnormally carried out by the microcomputer 3.

However, as illustrated in FIG. 13B, when a malfunction occurs in the RTOS 51 so that the idle task T2 is not waked up, the monitoring task is waked up by the CPU 21 in accordance with the task scheduler immediately after the completion of execution of the initial task T1 at time t51.

The monitoring task causes the program P to go into an infinite loop, resulting that the level conversion of the WDC signal is disabled. This allows the watchdog timer 17 to reset the microcomputer 3.

As described above, in the fifth embodiment, it is possible to detect that the idle task T2 is not waked up, thus resetting the microcomputer 3.

In the first to fifth embodiments and their modifications, the watchdog timer 17 can be configured by software or a hardware device. In addition, the watchdog timer 17 can be installed in the microcomputer 3. In this case, as a process to reset the watchdog timer 17, a process to set the measured length of time (count value) to its initial value can be used.

As a process to reset the microcomputer 3, a process to change the destination of execution of a program P to its leading address used when the microcomputer 3 is initially started.

In the first to fifth embodiments and their modifications, each of the programs P can be designed without containing therein the RTOS 51 itself and designed under the RTOS 51.

In the first to fifth embodiments, the programs illustrated in FIGS. 5A to 5C, FIGS. 7A to 7C, FIGS. 9A and 9B, FIGS. 10A and 10B, FIG. 11, and FIGS. 12A and 12B can be installed in another microcomputer communicable with the microcomputer 3 so that they can cause another microcomputer alone or in cooperate with the microcomputer 3 to execute the tasks illustrated in FIGS. 5A to 5C, FIGS. 7A to 7C, FIGS. 9A and 9B, FIGS. 10A and 10B, FIG. 11, and FIGS. 12A and 12B.

In addition, those skilled in the art will appreciate that the present invention is capable of being distributed as program products, for example, the programs P including the program-execution monitoring program in the ROM 23 in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A computer readable storage medium tangibly storing a computer program that is accessible and executable by a computer operative to request a plurality of program tasks for wakeup so as to execute the plurality of program tasks in a predetermined schedule in accordance with a real time operating system running on the computer, the computer program causing at least one of the computer and another computer to execute the instructions of:

measuring a delay period between a request of at least one of the plurality of program tasks for wakeup of the at least one of the plurality of program tasks and a start of executing the at least one of the plurality of program tasks requested for wakeup; and comparing the measured delay period with a predetermined first timeout value, thus determining whether the at least one of the plurality of tasks is abnormally executed by the computer based on the comparison result.

2. A computer readable storage medium according to claim 1, wherein the instructions further include:

disabling any interrupts and causing running state of the computer to go into an infinite loop when it is determined that the at least one of the plurality of program tasks is abnormally executed by the computer.

3. A computer readable storage medium according to claim 1, wherein a watchdog timer is installed in one of the interior of the computer or the exterior thereof, the watchdog timer being configured to cause the computer to be reset unless the watchdog timer is reset at first regular intervals by a reset signal sent from the computer, the computer being configured to run a reset program to thereby execute a process for resetting the watchdog timer at second regular intervals shorter than the first regular intervals, the instructions further include:

disabling the process for resetting the watchdog timer to thereby reset the computer.

4. A computer readable storage medium according to claim 3, wherein at least one of the instructions of the measuring and the comparing is configured to be contained in the reset program.

5. A computer readable storage medium according to claim 1, wherein the plurality of program tasks have a plurality of different respective priorities, the predetermined schedule required to request the plurality of program tasks to wake up for execution is determined based on the plurality of priorities of the plurality of program tasks, respectively, the first timeout value is provided in a plurality, and the plurality of first timeout values are set for the plurality of priorities, respectively.

6. A computer readable storage medium according to claim 1, wherein the at least one of the plurality of program tasks whose delay period is measured corresponds to an event appearing temporally asynchronously and being input to the computer.

7. A computer readable storage medium according to claim 1, wherein each of the plurality of program tasks has a priority, the predetermined schedule required to request the plurality of program tasks to wake up for execution is determined based on the priorities of the plurality of program tasks, and the plurality of program tasks include an idle task and a time-synchronized task with the lowest priority in the plurality of program tasks except for the idle task, the time-synchronized task being requested to wake up every predetermined period, the time-synchronized task being the at least one of the plurality of program tasks whose delay period is measured.

8. A computer readable storage medium according to claim 1, wherein each of the plurality of program tasks has a priority, the predetermined schedule required to request the plurality of program tasks to wake up for execution is determined based on the priorities of the plurality of program tasks, and the plurality of program tasks include an idle task and a temporally asynchronous task, the temporally asynchronous task corresponding to an event appearing temporally asynchronously and being input to the computer, the instructions further include:

measuring an execution time of the temporally asynchronous task; and comparing the measured execution time with a predetermined second timeout value, thus determining whether an abnormality occurs in the computer based on the comparison result.

9. A computer readable storage medium according to claim 1, wherein the plurality of program tasks include a time-synchronized task, the time-synchronized task being requested to wake up every predetermined period, the instructions further include:

measuring an execution interval between at least one pair of temporally adjacent time-synchronized tasks waking up; and comparing the measured execution with a predetermined second timeout value, thus determining whether an abnormality occurs in the computer based on the comparison result.

10. A computer readable storage medium according to claim 1, wherein a watchdog timer is installed in one of the interior of the computer or the exterior thereof, the watchdog timer being configured to cause the computer to be reset unless the watchdog timer is reset at first regular intervals by a reset signal sent from the computer, the computer being configured to run a reset program to thereby execute a process for resetting the watchdog timer at second regular intervals shorter than the first regular intervals, the plurality of program tasks including an initial task, the initial task being requested to wake up upon the computer being booted, the computer being configured to run a timer program to thereby wake up the reset program at predetermined time intervals, the timer program being contained in the initial task.

11. A computer readable storage medium according to claim 1, wherein each of the plurality of program tasks has a priority, the predetermined schedule required to request the plurality of program tasks to wake up for execution is determined based on the priorities of the plurality of program tasks, and the plurality of program tasks include an idle task and a monitoring task, the monitoring task being lower in priority than the idle task, the instructions further include:

requesting a wakeup of the monitoring task for execution;

determining whether the monitoring task is waked up; and determining that an abnormality occurs in the computer based on the determination of whether the monitoring task is waked up.

12. A computer readable storage medium tangibly storing a computer program that is accessible and executable by a computer operative to request a plurality of program tasks for wakeup so as to execute the plurality of program tasks in a predetermined schedule in accordance with a real time operating system running on the computer, the computer program causing at least one of the computer and another computer to execute the instructions of:

measuring a delay period between a request of at least one of the plurality of program tasks and a wakeup thereof; and comparing the measured delay period with a predetermined first timeout value, thus determining whether at least one of the plurality of tasks is abnormally executed by the computer based on the comparison result;

wherein the at least one of the plurality of program tasks whose delay period is measured includes a repeatedly wakeup-requestable task, the repeatedly wakeup-requestable task allowing repeated requests while being executed by the computer, the instructions further include:

measuring a first number indicative of the repeated executions of the repeatedly wakeup-requestable task required to meet a second number of repeated requests, wherein the measuring of the delay period is configured to:

measure the delay time between the first request of the repeatedly wakeup-requestable task in the repeated requests and a wakeup thereof; and measure a time interval between start timing of execution of the repeatedly wakeup-requestable task corresponding to one of the repeatedly requests except for the first request and start timing of execution of the repeatedly wakeup-requestable task corresponding to another one of the repeatedly requests next to the one of the repeatedly requests.

13. A computer readable storage medium according to claim 12, the instructions include:

when one of the repeated requests of the repeatedly wakeup-requestable task is generated upon the first number representing a predetermined upper limit, determining whether the one of the repeated requests is accepted by the computer; and determining that at least one of the plurality of tasks is abnormally executed by the computer based on the determination of whether the one of the repeated requests is accepted by the computer.

14. A computer readable storage medium according to claim 12, the instructions include:

when one of the repeated requests of the repeatedly wakeup-requestable task is generated upon the first number representing zero, determining whether the one of the repeated requests is accepted by the computer; and determining that at least one of the plurality of tasks is abnormally executed by the computer based on the determination of whether the one of the repeated requests is accepted by the computer.

15. A computer capable of executing the computer program of claim 1.

16. An electronic unit having a microcomputer capable of executing the computer program of claim 1.

17. A computer-implemented method for a computer to detect an abnormal execution of a plurality of program tasks, the plurality of program tasks being requested for wakeup so as to be executed in a predetermined schedule in accordance with a real time operating system running on the computer, the computer implemented method comprising:

measuring, by the computer, a delay period between a request of at least one of the plurality of program tasks for wakeup of the at least one of the plurality of program tasks and a start of executing the at least one of the plurality of program tasks requested for wakeup; and comparing, by the computer, the measured delay period with a predetermined timeout value, thus determining whether the at least one of the plurality of tasks is abnormally executed by the computer based on the comparison result.

18. A computer readable storage medium according to claim 1, wherein the at least one of the plurality of program tasks whose delay period is measured includes a repeatedly wakeup-requestable task, the repeatedly wakeup-requestable task being allowed to be repeatedly requested for wakeup of the repeatedly wakeup-requestable task while being executed by the computer, the instructions further include:

measuring a first number indicative of the repeated executions of the repeatedly wakeup-requestable task required to meet a second number of repeated requests, wherein the measuring of the delay period is configured to:

measure the delay time between the first request of the repeatedly wakeup-requestable task in the repeated requests and a wakeup of the repeatedly wakeup-requestable task; and measure a time interval between start timing of execution of the repeatedly wakeup-requestable task corresponding to one of the repeatedly requests except for the first request and start timing of execution of the repeatedly wakeup-requestable task corresponding to another one of the repeatedly requests next to the one of the repeatedly requests.

19. A computer readable storage medium according to claim 18, the instructions include:

when one of the repeated requests of the repeatedly wakeup-requestable task is generated upon the first number representing a predetermined upper limit, determining whether the one of the repeated requests is accepted by the computer; and determining that an abnormality occurs in the computer based on the determination of whether the one of the repeated requests is accepted by the computer.

20. A computer readable storage medium according to claim 18, the instructions include:

when one of the repeated requests of the repeatedly wakeup-requestable task is generated upon the first number representing zero, determining whether the one of the repeated requests is accepted by the computer; and determining that an abnormality occurs in the computer based on the determination of whether the one of the repeated requests is accepted by the computer.

* * * * *